US 7,092,909 B2

(12) United States Patent
Muto et al.

(10) Patent No.: US 7,092,909 B2
(45) Date of Patent: Aug. 15, 2006

(54) INFORMATION PROCESSING APPARATUS AND METHOD, AND DISTRIBUTION MEDIUM

(75) Inventors: Akihiro Muto, Tokyo (JP); Tateo Oishi, Saitama (JP); Taizo Shirai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/796,449

(22) Filed: Mar. 9, 2004

(65) Prior Publication Data

US 2004/0172366 A1    Sep. 2, 2004

Related U.S. Application Data

(63) Continuation of application No. 09/607,692, filed on Jun. 30, 2000, now abandoned.

(30) Foreign Application Priority Data

Jul. 7, 1999    (JP)    ............................. P11-192613

(51) Int. Cl.
*H04L 9/32*    (2006.01)
(52) U.S. Cl. ..................... 705/52; 705/57; 705/59; 380/30; 380/202; 380/203; 713/200; 713/201
(58) Field of Classification Search ................. 705/52, 705/57, 59; 380/30, 202, 20; 713/200, 201
See application file for complete search history.

(56) References Cited

U.S. PATENT DOCUMENTS 5,673,316 A    9/1997    Auerbach et al.

6,253,193 B1 *    6/2001    Ginter et al. ................. 705/57
6,424,949 B1 *    7/2002    Deaton et al. ................. 705/14

FOREIGN PATENT DOCUMENTS

JP    2004078259 A    *    7/2002

OTHER PUBLICATIONS

Users Bemoan Licensing Policies; Busse, Torsten; InfoWorld, v14n16, p. 52-53, Apr. 20, 1992.*
Two-pronged SDMI scheme counts on audio-player makers, publishers— Internet music-protection plan heads for vote . . . ; (Secure Digital Music Initiative is to Approve Version 1.0 of its specification for portable Internet music device) Electronic Engineering Times, p. 16, Jul. 5, 1999.*

* cited by examiner

*Primary Examiner*—Kambiz Abdi
*Assistant Examiner*—Daniel L. Greene
(74) *Attorney, Agent, or Firm*—Bell, Boyd & Lloyd LLC

(57)    ABSTRACT

An information processing apparatus utilizing encrypted information corresponding to content of purchased right, includes a memory for storing the encrypted information, usage control policy indicating content of purchased right and price tag for specifying price content corresponding to the content of the purchased right. A first generating device generates a usage control status including the purchase history of the information on the basis of the usage control policy and the price tag stored in the memory. A setting device sets usage history based on usage of the information to the usage control status. A second generating device calculates an accounting price and generates accounting information including the accounting price based on the purchase history or the usage history, and/or puts a limit on purchasable usage conditions based on the purchase history or the usage history on the occasion the right is purchased again on different format from the control policy.

3 Claims, 24 Drawing Sheets

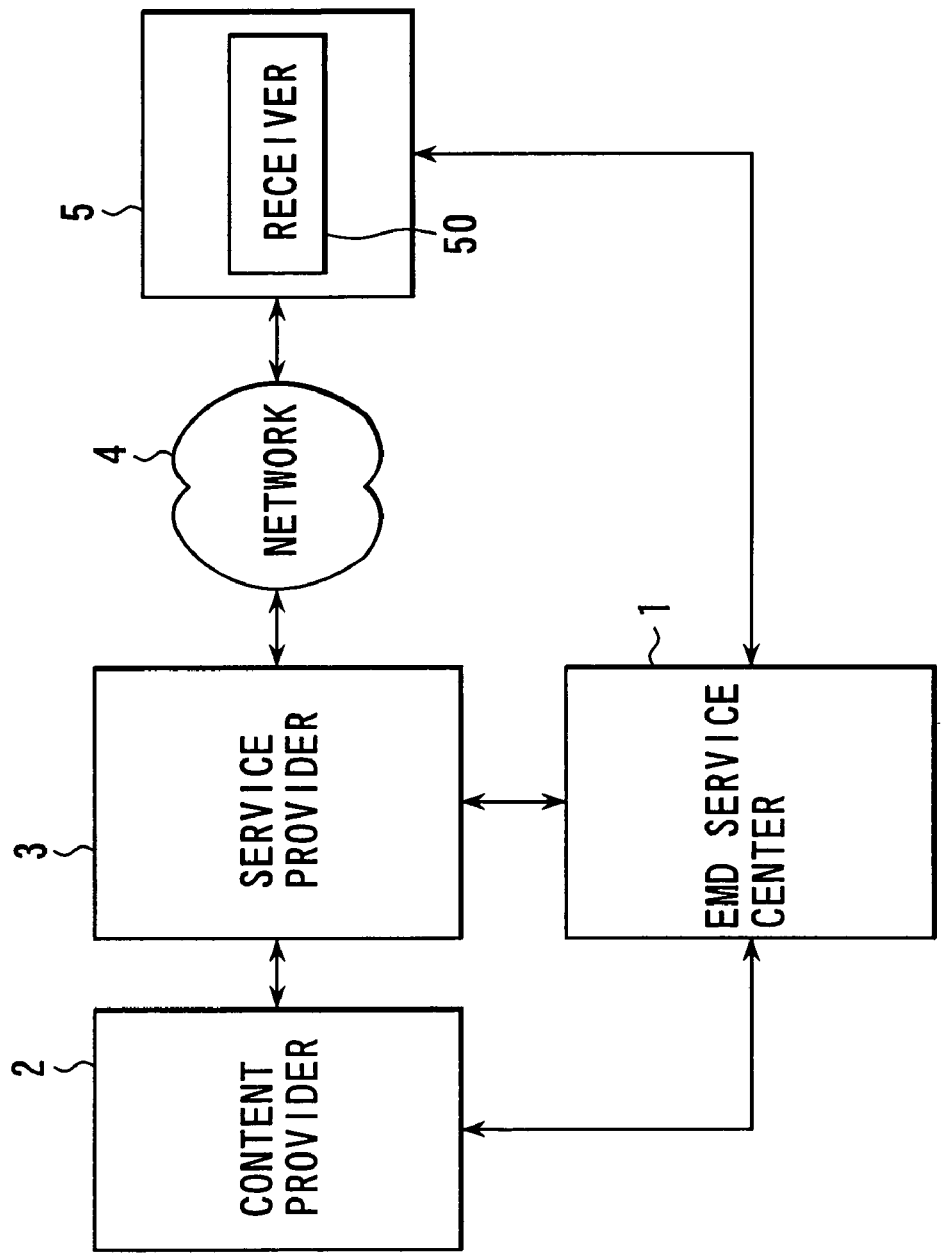

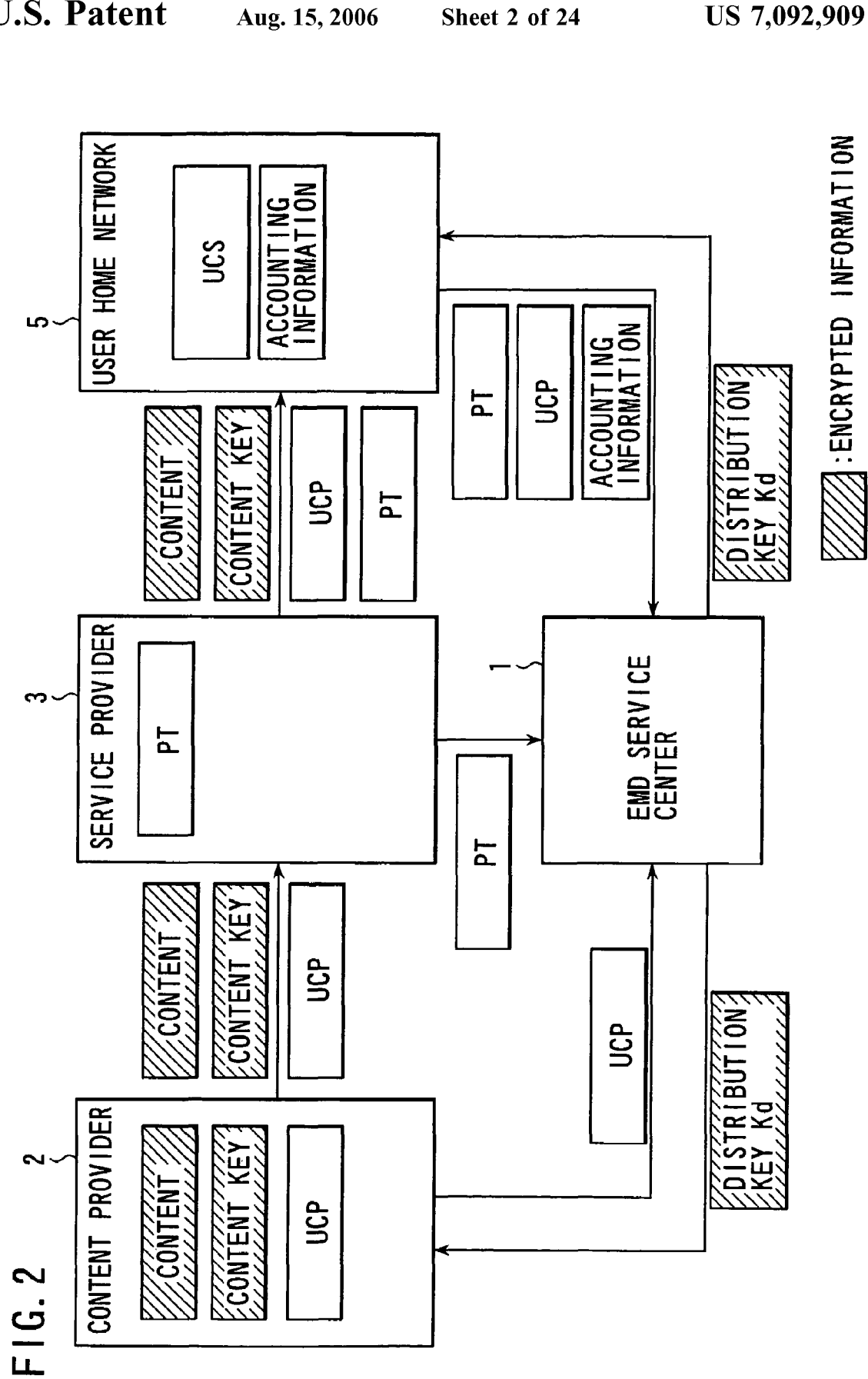

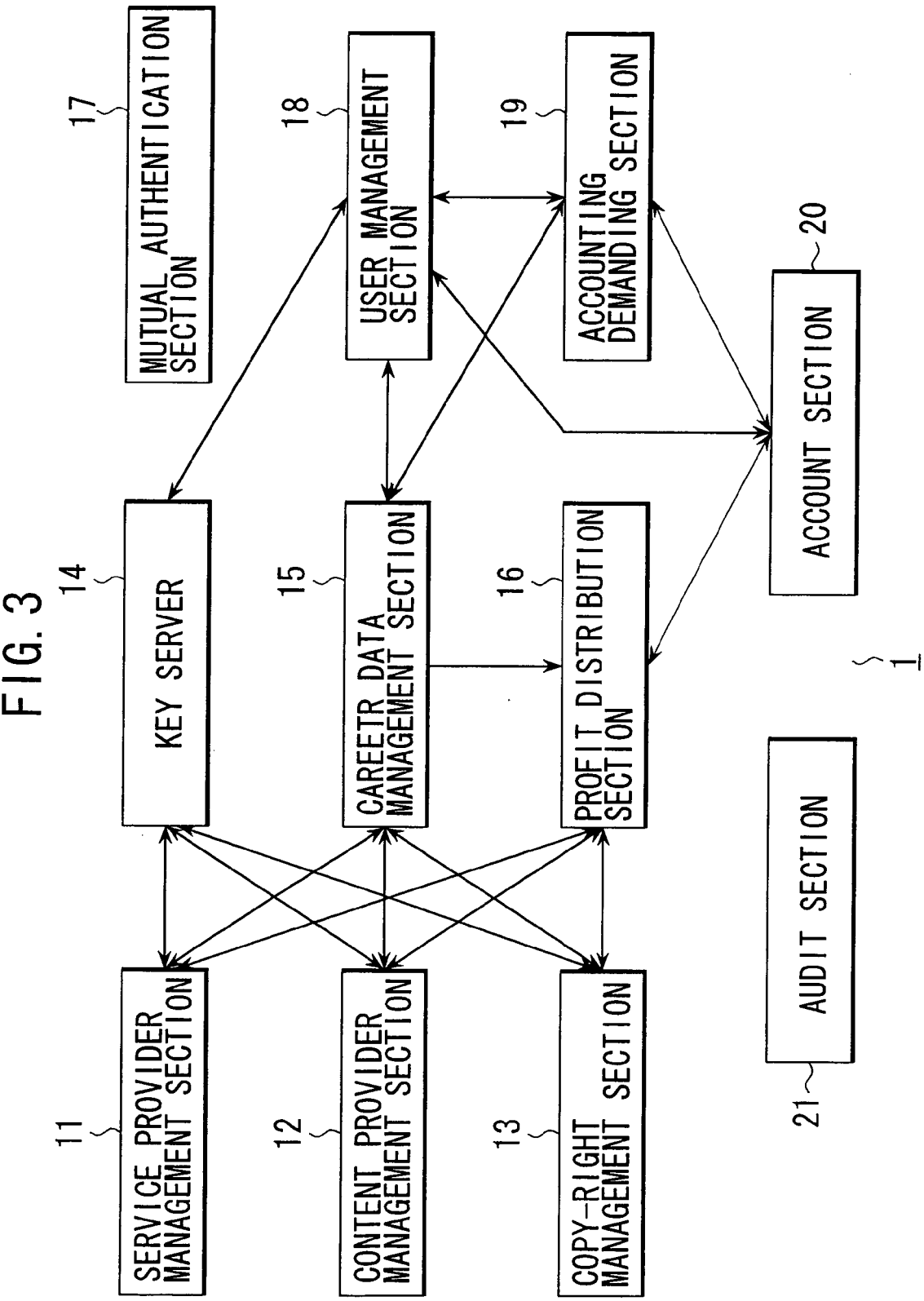

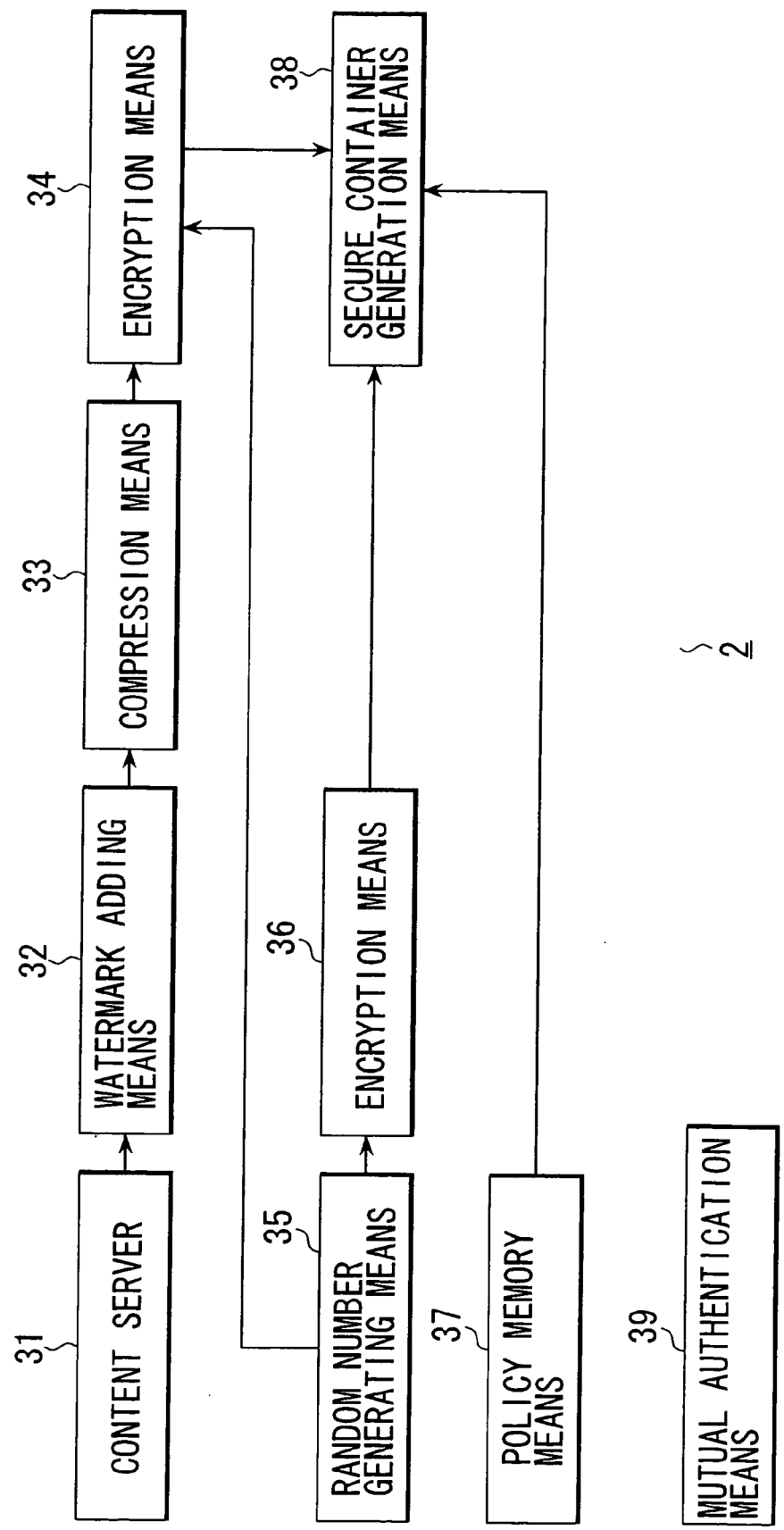

FIG. 5

| ID OF CONTENT | ID OF CONTENT A | |
|---|---|---|
| ID OF CONTENT PROVIDER | ID OF CONTENT PROVIDER 2 | |
| ID OF UCP | ID OF ucpA | |
| PERIOD OF VALIDITY OF UCP | PERIOD OF VALIDITY OF ucpA | |
| USAGE CONDITION 10 | USER CONDITION 10 | 200 POINTS OR MORE |
| | DEVICE CONDITION 10 | NO CONDITION |
| USAGE CONTENT 11 | ID 11 | ID OF USAGE CONTENT 11 |
| | FORMAT 11 | PURCHASE AND REPRODUCTION |
| USAGE CONTENT 12 | ID 12 | ID OF USAGE CONTENT 12 |
| | FORMAT 12 | REPRODUCTION WITH PERIOD LIMITATION |
| USAGE CONTENT 13 | ID 13 | ID OF USAGE CONTENT 13 |
| | FORMAT 13 | REPRODUCTION WITH USAGE TIME LIMITATION |
| USAGE CONTENT 14 | ID 14 | ID OF USAGE CONTENT 14 |
| | FORMAT 14 | Pay Per Copy N |
| USAGE CONTENT 15 | ID 15 | ID OF USAGE CONTENT 15 |
| | FORMAT 15 | FORMAT 12→ FORMAT 11 |
| USAGE CONTENT 16 | ID 16 | ID OF USAGE CONTENT 16 |
| | FORMAT 16 | FORMAT 14 >= 11TH TIMES | ucpA

FIG. 9A

| | | | |
|---|---|---|---|
| ID OF CONTENT | A | | |
| ID OF CONTENT PROVIDER | 2 | | |
| ID OF UCP | UCPA | | |
| PERIOD OF VALIDITY OF UCP | | | |
| ID OF SERVICE PROVIDER | 3 | | |
| ID OF PT | PTA-1 | | |
| PERIOD OF VALIDITY OF PT | | | |
| PRICE CONDITION 10 | USER CONDITION 10 | MALE | NO CONDITION |
| | DEVICE CONDITION 10 | | |
| PRICE CONTENT 11 | | ¥2,000 | |
| PRICE CONTENT 12 | | ¥600 | |
| PRICE CONTENT 13 | | ¥300 | |
| PRICE CONTENT 14 | | ¥100 | |
| PRICE CONTENT 15 | | | ¥1,950 |
| PRICE CONTENT 16 | | | ¥50 |

PTA-1

FIG. 9B

| | | | |
|---|---|---|---|
| ID OF CONTENT | A | | |
| ID OF CONTENT PROVIDER | 2 | | |
| ID OF UCP | UCPA | | |
| PERIOD OF VALIDITY OF UCP | | | |
| ID OF SERVICE PROVIDER | 3 | | |
| ID OF PT | PTA-2 | | |
| PERIOD OF VALIDITY OF PTA-2 | | | |
| PRICE CONDITION 20 | DEVICE CONDITION 20 | NO CONDITION | |
| | USER CONDITION 20 | | FEMALE |
| PRICE CONTENT 21 | | ¥1,000 | |
| PRICE CONTENT 22 | | ¥300 | |
| PRICE CONTENT 23 | | ¥150 | |
| PRICE CONTENT 24 | | ¥50 | |
| PRICE CONTENT 25 | | | ¥980 |
| PRICE CONTENT 26 | | | ¥25 |

PTA-2

FIG. 13

| ID OF CONTENT | ID OF CONTENT A |
|---|---|
| ID OF CONTENT PROVIDER | ID OF CONTENT PROVIDER 2 |
| ID OF UCP | ID OF UCPA |
| PERIOD OF VALIDITY OF UCP | PERIOD OF VALIDITY OF UCPA |
| ID OF SERVICE PROVIDER | ID OF SERVICE PROVIDER 3 |
| ID OF PT | ID OF PTA-1 |
| PERIOD OF VALIDITY OF PT | PERIOD OF VALIDITY OF PTA-1 |
| ID OF UCS | ID OF UCSA |
| ID OF SAM | ID OF SAM51 |
| ID OF USER | ID OF USER |
| USAGE CONTENT — ID | × × × |
| USAGE CONTENT — FORMAT | × × × |
| PARAMETER | × × × |
| PURCHASE HISTORY | × × × |

UCSA

FIG. 14

| ID OF CONTENT | ID OF CONTENT A |
|---|---|
| ID OF CONTENT PROVIDER | ID OF CONTENT PROVIDER 2 |
| ID OF UCP | ID OF ucpA |
| PERIOD OF VALIDITY OF UCP | PERIOD OF VALIDITY OF ucpA |
| ID OF SERVICE PROVIDER | ID OF SERVICE PROVIDER 3 |
| ID OF PT | ID OF ptA-1 |
| PERIOD OF VALIDITY OF PT | PERIOD OF VALIDITY OF ptA-1 |
| ID OF UCS | ID OF ucsA |
| ID OF SAM | ID OF SAM51 |
| ID OF USER | ID OF USER |
| USAGE CONTENT — ID | × × × |
| USAGE CONTENT — FORMAT | × × × |
| ACCOUNTING AMOUNT | × × × |

ACCOUNTING INFORMATION A

FIG. 18

| ID OF CONTENT | ID OF CONTENT 1, 2, 3, 4 | |
|---|---|---|
| ID OF CONTENT PROVIDER | ID OF CONTENT PROVIDER 2 | |
| ID OF UCP | ID OF UCPZ | |
| PERIOD OF VALIDITY OF UCP | PERIOD OF VALIDITY OF UCPZ | |
| USAGE CONDITION 100 | USER CONDITION 100 | ××× |
| | DEVICE CONDITION 100 | ××× |
| USAGE CONTENT 101 | ID 101 | ID OF USAGE CONTENT |
| | FORMAT 101 | PURCHASE AND REPRODUCTION |

UCPZ

FIG. 19

| ID OF CONTENT | ID OF CONTENTS 1, 2, 3, AND 4 | |
|---|---|---|
| ID OF CONTENT PROVIDER | ID OF CONTENT PROVIDER 2 | |
| ID OF UCP | ID OF UCPZ | |
| ID OF SERVICE PROVIDER | ID OF SERVICE PROVIDER 3 | |
| ID OF PT | ID OF PTZ-1 | |
| PERIOD OF VALIDITY OF PT | PERIOD OF VALIDITY OF PTZ-1 | |
| PRICE CONDITION 100 | USER CONDITION 100 | ××× |
| | DEVICE CONDITION 100 | ××× |
| PRICE CONTENT 101 | | ¥2,500 |

PTZ

FIG. 20

| ID OF CONTENT | ID OF CONTENT 1 |
|---|---|
| ID OF CONTENT PROVIDER | ID OF CONTENT PROVIDER 2 |
| ID OF UCP | ID OF UCPA |
| PERIOD OF VALIDITY OF UCP | PERIOD OF VALIDITY OF UCPA |
| ID OF SERVICE PROVIDER | ID OF SERVICE PROVIDER 3 |
| ID OF PT | ID OF PTA-1 |
| PERIOD OF VALIDITY OF PT | PERIOD OF VALIDITY OF PTA-1 |
| ID OF UCS | ID OF UCSA |
| ID OF SAM | ID OF SAM51 |
| ID OF USER | ID OF USER |
| USAGE CONTENT — ID | USAGE CONTENT 11 |
| USAGE CONTENT — FORMAT | PURCHASE AND REPRODUCTION |
| PARAMETER | × × × |
| PURCHASE HISTORY | × × × |

UCS1

FIG. 21

| ID OF CONTENT | ID OF CONTENT 2 |
|---|---|
| ID OF CONTENT PROVIDER | ID OF CONTENT PROVIDER 2 |
| ID OF UCP | ID OF UCPA |
| PERIOD OF VALIDITY OF UCP | PERIOD OF VALIDITY OF UCPA |
| ID OF SERVICE PROVIDER | ID OF SERVICE PROVIDER 3 |
| ID OF PT | ID OF PTA-1 |
| PERIOD OF VALIDITY OF PT | PERIOD OF VALIDITY OF PTA-1 |
| ID OF UCS | ID OF UCSA |
| ID OF SAM | ID OF SAM51 |
| ID OF USER | ID OF USER |
| USAGE CONTENT — ID | USAGE CONTENT 11 |
| USAGE CONTENT — FORMAT | PURCHASE AND REPRODUCTION |
| PARAMETER | × × × |
| PURCHASE HISTORY | × × × |

UCS2

FIG. 23

| ID OF CONTENT | | ID OF CONTENT A |
|---|---|---|
| ID OF CONTENT PROVIDER | | ID OF CONTENT PROVIDER 2 |
| ID OF UCP | | ID OF ucpA |
| PERIOD OF VALIDITY OF UCP | | PERIOD OF VALIDITY OF ucpA |
| ID OF SERVICE PROVIDER | | ID OF SERVICE PROVIDER 3 |
| ID OF PT | | ID OF ptA-1 |
| PERIOD OF VALIDITY OF PT | | PERIOD OF VALIDITY OF ptA-1 |
| ID OF UCS | | ID OF ucsA |
| ID OF SAM | | ID OF SAM51 |
| ID OF USER | | ID OF USER |
| USAGE CONTENT | ID | ×××  |
| | FORMAT | ××× |
| PARAMETER | | ××× |
| PURCHASE HISTORY | | ××× |
| USAGE HISTORY | | ××× | ucsA10

FIG. 24

| ID OF CONTENT | ID OF CONTENT A | |
|---|---|---|
| ID OF CONTENT PROVIDER | ID OF CONTENT PROVIDER 2 | |
| ID OF UCP | ID OF ucpA | |
| PERIOD OF VALIDITY OF UCP | PERIOD OF VALIDITY OF ucpA | |
| USAGE CONDITION 10 | USER CONDITION 10 | 200 POINTS OR MORE |
| | DEVICE CONDITION 10 | NO-CONDITION |
| USAGE CONTENT 11 | ID 11 | ID OF USAGE CONTENT 11 |
| | FORMAT 11 | PURCHASE AND REPRODUCTION |
| USAGE CONTENT 12 | ID 12 | ID OF USAGE CONTENT 12 |
| | FORMAT 12 | REPRODUCTION WITH PERIOD LIMITATION |
| USAGE CONTENT 13 | ID 13 | ID OF USAGE CONTENT 13 |
| | FORMAT 13 | REPRODUCTION WITH USAGE TIME LIMITATION |
| USAGE CONTENT 14 | ID 14 | ID OF USAGE CONTENT 14 |
| | FORMAT 14 | Pay Per Copy N |
| USAGE CONTENT 15 | ID 15 | ID OF USAGE CONTENT 15 |
| | FORMAT 15 | FORMAT 12 → FORMAT 11 |
| USAGE CONTENT 16 | ID 16 | ID OF USAGE CONTENT 16 |
| | FORMAT 16 | FORMAT 14 >= 11TH TIMES |
| USAGE CONTENT 17 | ID 17 | ID OF USAGE CONTENT 17 |
| | FORMAT 17 | REPRODUCTION OF 10TH TIMES → FORMAT 14 | ucpA10

FIG. 25A

| | | MALE | NO CONDITION |
|---|---|---|---|
| ID OF CONTENT | ID OF CONTENT A | | |
| ID OF CONTENT PROVIDER | ID OF CONTENT PROVIDER 2 | | |
| ID OF UCP | ID OF UCPA | | |
| PERIOD OF VALIDITY OF UCP | PERIOD OF VALIDITY OF UCPA | | |
| ID OF SERVICE PROVIDER | ID OF SERVICE PROVIDER 3 | | |
| ID OF PT | ID OF PTA-1 | | |
| PERIOD OF VALIDITY OF PT | PERIOD OF VALIDITY OF PTA-1 | | |
| PRICE CONDITION 10 | USER CONDITION 10 | | |
| | DEVICE CONDITION 10 | | |
| PRICE CONTENT 11 | | ¥2,000 | |
| PRICE CONTENT 12 | | | ¥600 |
| PRICE CONTENT 13 | | ¥300 | |
| PRICE CONTENT 14 | | | ¥100 |
| PRICE CONTENT 15 | | ¥1,950 | |
| PRICE CONTENT 16 | | | ¥50 |
| PRICE CONTENT 17 | | | ¥75 |

PTA10-1

FIG. 25B

| | | FEMALE | NO CONDITION |
|---|---|---|---|
| ID OF CONTENT | ID OF CONTENT A | | |
| ID OF CONTENT PROVIDER | ID OF CONTENT PROVIDER 2 | | |
| ID OF UCP | ID OF UCPA | | |
| PERIOD OF VALIDITY OF UCP | PERIOD OF VALIDITY OF UCPA | | |
| ID OF SERVICE PROVIDER | ID OF SERVICE PROVIDER 3 | | |
| ID OF PT | ID OF PTA-2 | | |
| PERIOD OF VALIDITY OF PT | PERIOD OF VALIDITY OF PTA-2 | | |
| PRICE CONDITION 20 | USER CONDITION 20 | | |
| | DEVICE CONDITION 20 | | |
| PRICE CONTENT 21 | | ¥1,000 | |
| PRICE CONTENT 22 | | | ¥300 |
| PRICE CONTENT 23 | | ¥150 | |
| PRICE CONTENT 24 | | | ¥50 |
| PRICE CONTENT 25 | | ¥980 | |
| PRICE CONTENT 26 | | | ¥25 |
| PRICE CONTENT 27 | | | ¥45 |

PTA10-2

INFORMATION PROCESSING APPARATUS AND METHOD, AND DISTRIBUTION MEDIUM

CROSS REFERENCE TO RELATED APPLICATIONS

This patent application is a continuation of U.S. application Ser. No. 09/607,692, filed on Jun. 30, 2000 now abandoned, the disclosure of which is herein incorporated by reference.

BACKGROUND OF THE INVENTION

1. Field of the Invention

The present invention relates to an information processing apparatus and method and a distribution medium and particularly to an information processing apparatus and method and a distribution medium for utilizing the encrypted information.

2. Description of the Related Art

There is provided a system in which information (content) such as a music program is encrypted and is then transmitted to an information processing apparatus of a user who has become a subscriber by signing the predetermined contract and thereby a user can utilize the content through the decoding thereof with such information processing apparatus.

In the information processing apparatus of the related art, it has been impossible, for example, to purchase again the content in the price based on the purchase history of such content.

SUMMARY OF THE INVENTION

According to one aspect of the present invention, the information processing apparatus comprises memory means for storing the encrypted information, usage control policy indicating content of purchased right and price tag for specifying price content corresponding to the content of the purchased right, first generating means for generating usage control status including purchase history of the information on the basis of the usage control policy and the price tag being stored in the memory means, setting means for setting usage history based on usage of the information to the usage control status, and second generating means for, on the occasion of purchasing the right again, calculating an accounting price and generating accounting information including the accounting price based on the purchase history or the usage history and/or putting a limit on purchasable usage conditions based on the purchase history or the usage history.

According to another aspect of the present invention, the information processing method comprises a storing step for storing the encrypted information, usage control policy indicating content of the purchased right and price tag for specifying price content corresponding to content of the right, a first generating step for generating the usage control status including purchase history of the information based on the usage control policy and the price tag stored in the storing step, a setting step for setting usage history based on usage of the information to the usage control status, and a second generating step for, on the occasion of purchasing the right again, calculating an accounting price and generating accounting information including the accounting price based on the purchase history or the usage history and/or putting a limit on purchasable usage conditions based on the purchase history or the usage history According to another aspect of the present invention, a distribution medium provides a computer-readable program making an information processing apparatus, which utilizes the encrypted information through decoding thereof corresponding to content of purchased right, execute the processes, comprising a storing step for storing the encrypted information, usage control policy indicating content of the purchased right and price tag for specifying price content corresponding to content of the right, a first generating step for generating the usage control status including purchase history of the information based on the usage control policy and the price tag stored in the storing step, a setting step for setting usage history based on usage of the information to the usage control status, and a second generating step for, on the occasion of purchasing the right again, calculating an accounting price and generating accounting information including the accounting price based on the purchase history or the usage history and/or putting a limit on purchasable usage conditions based on the purchase history or the usage history.

According to still another aspect of the present invention, in the information processing apparatus, information processing method and distribution medium described, the encrypted information, usage control policy indicating content of right to be purchased and price tag for specifying price content corresponding to content of right are stored, the usage control status including information purchase history is generated on the basis of stored usage control policy and price tag, the usage history based on usage of information is set to the usage control status, and on the occasion of purchasing the right again, the accounting price is calculated and the accounting information including the accounting price is also generated based on the purchase history or usage history and/or a limit on purchasable usage conditions is put based on the purchase history or usage history.

BRIEF DESCRIPTION OF THE DRAWINGS

FIG. 1 is a diagram for explaining the EMD system.

FIG. 2 is a diagram for explaining the flow of main information in the EMD system.

FIG. 3 is a block diagram illustrating the functional structure of the EMD service center 1.

FIG. 4 is a block diagram illustrating an example of functional structure of the content provider 2.

FIG. 5 is a diagram illustrating an example of UCP.

FIGS. 9A and 9B are diagrams illustrating an example of PT.

FIG. 13 is a diagram illustrating an example of UCS.

FIG. 14 is a diagram illustrating an example of accounting information.

FIG. 18 is a diagram illustrating another example of UCP.

FIG. 19 is a diagram illustrating another example of PT.

FIG. 20 is a diagram illustrating another example of UCS.

FIG. 21 is a diagram illustrating the other example of UCS.

FIG. 23 is a diagram illustrating the other example of UCS.

FIG. 24 is a diagram illustrating the other example of UCP.

FIGS. 25A and 25B are diagrams illustrating the other example of PT.

DESCRIPTION OF THE PREFERRED EMBODIMENTS

Figure 6:
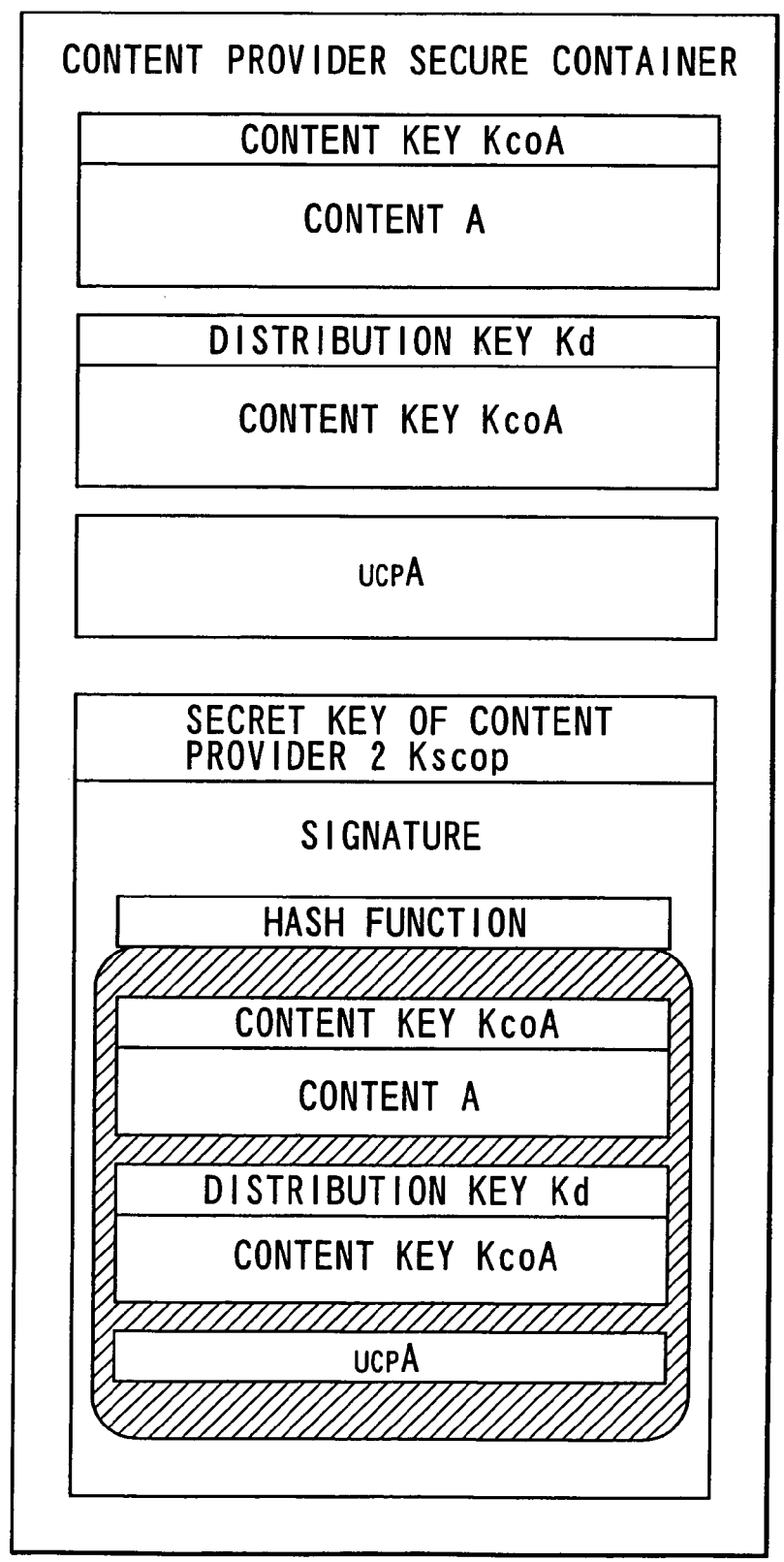
FIG. 6 is a diagram illustrating an example of the content provider secure container.

FIG. 1 is a diagram for explaining the EMD (Electronic Music Distribution) system to which the present invention is applied. The EMD system is composed of an EMD service center 1 provided for management of each apparatus, a content provider 2 for distributing the content, a service provider 3 for providing the predetermined service corresponding to the content and a user home network 5 consisting of an apparatus (a receiver 50, in this case) for utilizing the content.

Content to be distributed (provided) to the apparatus (for example, a receiver 50) registered to the EMD system is a digital data in which information itself has the worth. In this embodiment, one content corresponds to the music data of one music program. Content is distributed to users in unit one content (single format) or in unit of a plurality of contents (album format). A user purchases the content (actually, purchases the right of utilizing the content) and thereby the user can reproduce and duplicate the contents.

The EMD service center 1 transmits, as illustrated in FIG. 2 indicating the main flow of information in the EMD system, the distribution key Kd required to utilize the content to a user home network 5 and a content provider 2. The EMD service center 1 also receives the accounting information or the like from the apparatus of user home network 5 to adjust the usage accounting.

The content provider 2 holds the content to be distributed (encrypted with the content key Kco), content key Kco required to decode the content (encrypted with the distribution key Kd) and usage control policy indicating usage content of such content (hereinafter referred to as USP (Usage Control Policy)) and then supplies these data to the service provider 3 in the form called the content provider secure container (explained later).

The service provider 3 generates one or a plurality of price tags (PT) and holds these data. The service provider 3 transmits the generated PT to the user hole network 5 via the network 4 formed of an exclusive cable network, Internet or satellite communication in the form called the service provider secure container together with the content supplied from the content provider 2 (encrypted with the content key Kco), content key Kco (encrypted with the distribution key Kd) and UCP.

The user home network 5 generates the usage control status based on the UCP and PT supplied and executes the process to use the content based on the generated UCS. The user home network 5 also generates the accounting information in the timing to generate UCS and transmits this information to the EMD service center 1 together with the corresponding UCP and PT in the timing to receive the supply, for example, of the distribution key Kd.

FIG. 3 is a block diagram illustrating the functional structure of the EMD service center 1. A service provider management section 11 supplies profit distribution information to the service provider 3. A content provider management section 12 transmits the distribution key Kd or supplies the profit distribution information to the content provider 2.

A copy right management section 13 transmits the information indicating the result of usage of content of the user home network 5 to the copy-right management organization, for example, JASRAC (Japanese Society for Rights of Authors, Composers and Publishers).

A key server 14 stores the distribution key Kd and thereby supplies such key to the content provider 2 via the content provider management section 12 and also supplies the key to the user home network 5 via the user management section 18 or the like. A career data management section 15 stores the accounting information, PT corresponding to the content and UCP corresponding to the content, etc. output from a user management section 18.

A profit distribution section 16 calculates, based on various information pieces supplied from the career data management section 15, the profits of the EMD service center 1, content provider 2 and service provider 3 and then outputs the result of calculation to the service provider management section 11, content provider management section 12, account section 20 and copy-right management section 13.

A mutual authentication section 17 executes mutual authentication of apparatuses of the content provider 2, service provider 3 and user home network 5. The user management section 18 generates a predetermined registration list corresponding to the predetermined process and transmits this list to the user home network 5 together with the distribution key Kd.

An accounting demand section 19 calculates the accounting for a user based, for example, on the accounting information, UCP and PT supplied from the career data management section 15 and then supplies the result to the account section 20. The account section 20 executes payment to user, content provider 2 and service provider 3 and also executes settlement of account for external banks not illustrated through the on-line communication based on the amount of usage accounting to be collected. The account section 20 also notifies the result of settlement of account to the user management section 18. An audit section 21 inspects the accounting information supplied from the apparatus of user home network 5 and validity of PT and UCP (namely, to check whether illegal usage is conducted or not).

FIG. 4 is a block diagram illustrating the functional structure of the content provider 2. A content server 31 stores the content distributed to users and supplies the content to a water mark adding means 32. The water mark adding means 32 adds the watermark to the content supplied from the content server 31 and then supplies such content with watermark to a compression means 33.

The compression means 33 compresses the content supplied from the watermark adding means 32 depending on the system such as ATRA C2 (Adaptive Transform Acoustic Coding 2)(trade-mark), etc. and then supplies the compressed content to an encryption means 34. The encryption means 34 ciphers the content compressed in the compression means 33 with the common key encryption system such as DES (Data Encryption Standard) using the random number supplied from the random number generation means 35 as a key (hereinafter, this random number is referred to as content key Kco) and thereafter outputs the result of encryption to a secure container generation means 38.

The random number generation means 35 supplies the random number of predetermined number of bits as the content key Kco to the encryption means 34 and 36. The encryption means 36 ciphers the content key Kco with the common key encryption system such as DES using the distribution key Kd supplied from the EMD service center 1 and then outputs the result of encryption to the secure container generation means 38.

DES is the encryption system in which 64 bits of plain text is processed as one block using the common key of 56 bits. The DES process is composed of the part for mixing the plain text to convert to the encrypted text (data mixing means) and the part for generating the key (magnifying key) used in the data mixing part from the common key (key processing means). Since all algorithms of DES are disclosed, the basic process in the data mixing means will be explained here.

First, the 64 bits of plain text is divided to $H_0$ of upper 32 bits and $L_0$ of lower 32 bits. The magnifying key K1 of 48 bits supplied from the key processing means and L0O of the lower 32 bits are input and an output of the F function in which the lower 32 bits are mixed can be calculated. The F function is composed of two kinds of basic conversion including "character replacement" for replacing a numeral depending on the predetermined rule and "relocation" for relocating the bit position depending on the predetermined rule. Next, $H_0$ of upper 32 bits and output of F function are exclusively ORed and the result is defined as $L_1$, while $L_0$ as $H_1$.

Based on $H_0$ of upper 32 bits and $L_0$ of lower 32 bits, the process explained above is repeated for 16 times and $H_{16}$ of upper 32 bits and $L_{16}$ of lower 32 bits obtained are output as the encrypted sentence. Encryption may be realized by inversely following the procedures explained above using the common key used for the encryption.

A policy memory 37 stores UCP to be set corresponding to the content and outputs this UCP to the secure container generation means 38. FIG. 5 illustrates UCPA in such a case that the content A stored in the content server 31 is provided in the single form.

As illustrated in FIG. 5, UCP includes the predetermined information set to each item of "ID of content provider", "ID of UCP", "Period of validity of UCP", "Usage condition" and "Usage content". To the "ID of content", ID of content corresponding to UCP is set. To the "ID of content" of UCP, ID of content A is set.

To the "ID of content provider", ID of content provider of the content providing source is set, while to the "ID of content provider" of UCPA, ID of content provider 2 is set. Moreover, the predetermined ID assigned to each UCP is set to the "ID of UCP" and ID of UCPA is set to the "ID of UCP". To the "Period of validity of UCP", the information indicating the period of validity of UCP is set and to the "Period of validity of UCP" of UCP, the period of validity of UCPA is set.

The "Usage condition" includes the predetermined information to be set to each item of "User condition" and "Device condition". To the "User condition", condition of user who can select this UCP is set. To the "Device condition", condition of device which can select this UCP is set.

In the case of UCPA, "Usage condition 10" is set and to the "User condition 10" of "Usage condition 10", the information indicating that the predetermined usage point given corresponding to the usage frequency of EMD system is 200 points or more ("200 points or more") is set. Moreover, to the "Device condition 10" of "Usage condition 10", the information indicating that there is no condition ("No condition") is set. Namely, only the user having the usage point of 2000 points or more can select the UCPA.

The "Usage content" includes the information to be set to each item of "ID" and "Format". To the "ID", the predetermined ID assigned to the information to be set to the "Usage content" is set. To the "Format", the information indicating usage format of content is set.

In the case of UCPA, the six usage contents from "Usage content 11" to "Usage content 16" are provided and to the "ID11" of "Usage content 11", the predetermined ID assigned to the "Usage content 11" is set. In the "Format 11", the information indicating the usage format for reproducing the content by purchasing it ("purchase and reproduction") is set. A user can reproduce the content A without any limitation by purchasing the right for use in the usage format of "Purchase and reproduction".

To the "ID 12" of "Usage content 12", the predetermined ID assigned to the "Usage content 12" is set. To the "Format 12", usage format of "reproduction with limitation of period" and start timing (time) and end timing (time) of such period are set. A user is capable of reproducing the content A only in the predetermined period (time) by purchasing the right for "Reproduction with limitation of period".

To the "ID 13" of "Usage content 13", the predetermined ID assigned to the "Usage content 13" is set. To the "Format 13", the usage format of "Reproduction with limitation of period" and predetermined specified period are set. A user is capable of reproducing the content A until the reproducing period (total time) expires the predetermined specified period (time) by purchasing the right for "Reproduction with limitation of period".

To the "ID 14" of "Usage content 14", the predetermined ID assigned to the "Usage content 14" is set. To the "Format 14", usage format and number of times of usage N of "Pay Per Play N" are set. A user is capable of reproducing the content A for N times by purchasing the right for "Pay Per Play N".

To the "ID 15" of "Usage content 15", the predetermined ID assigned to the "Usage content 15" is set. To the "Format 15", usage format of "Format 12→Format 11" is set. A user is capable of purchasing this right when the user has purchased the right for use in the usage format of "Reproduction with limitation of period". A user is also capable of utilizing the content A in the usage format of "Purchase and reproduction" (Format 11) by purchasing this right.

To the "ID 16" of "Usage content 16", the predetermined ID assigned to the "Usage content 16" is set. To the "Format 16", the usage format "Format 14>=11 times" is set. A user is capable of purchasing this right when the user has purchased 10 or more rights of "Pay Per Play N".

Returning to FIG. 4, the secure container generation means 38 generates, for example as illustrated in FIG. 6, the content provider secure container consisting of content A (encrypted with content key KcoA), content key KcoA (encrypted with the distribution key Kd), UCPA and signature thereof. As the signature, the data to be transmitted (in this case, content A (encrypted with the content key KcoA)), content key KcoA (encrypted with the distribution key Kd) and Hash value obtained by applying the Hash function to the entire part of UCPA are encrypted with the secret key (in this case, the secret key Kscp of content provider 2) of the disclosed key encryption.

Figure 7:
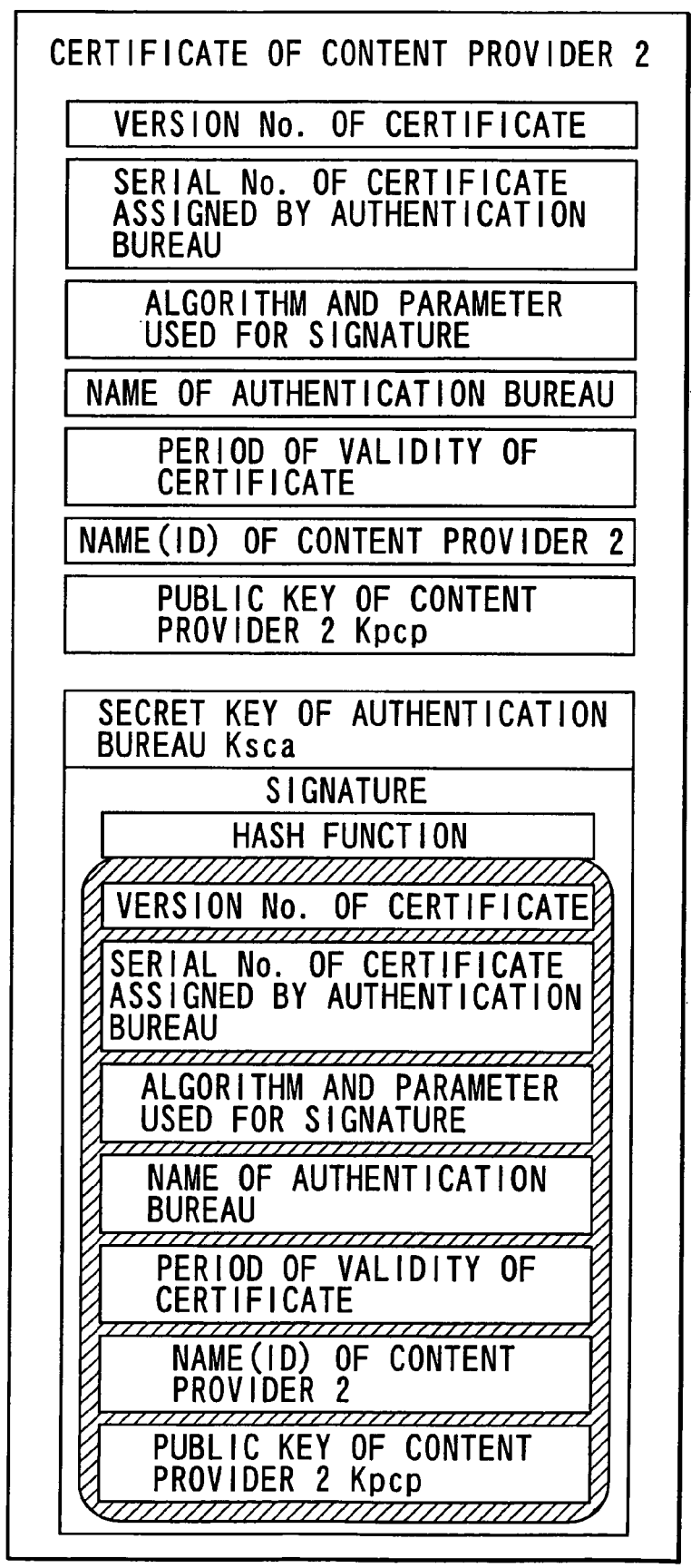
FIG. 7 is a diagram illustrating an example of the certificate of the content provider 2.

The secure container generation means 38 also adds the certificate of content provider 2 illustrated in FIG. 7 to the content provider secure container and then transmits it to the service provider 3. This certificate includes a version number of the certificate, a serial number of the certificate assigned to the content provider 2 from the authentication department, algorithm and parameter used in the signature, name of authentication department, period of validity of certificate, name of content provider 2, disclosed key Kpcp and signature (encrypted with the secret key Ksca of authentication department) of the content provider 2.

The signature is the data for checking falsification and authenticating a person who has generated the certificate and is generated by taking the Hash value with the Hash function based on the data to be transmitted and then ciphering such Hash value with the secret key of the disclosed key encryption.

Collation of Hash function and signature will be explained. The Hash function is used for inputting the predetermined data to be transmitted, compressing the data to the data of the predetermined bit length and then outputting the data as the Hash value. The Hash function has the characteristic that when it is difficult to forecast an input from the Hash value (output) and when one bit of data input to the Hash function is changed, many bits of Hash value are also changed and therefore it is moreover difficult to find out the input data having the identical Hash value.

A receiving side having received the signature and data decodes the signature with the disclosed key of the disclosed key encryption and obtains the result (Hash value) of decoding. Moreover, the Hash value of received data is calculated and it is determined whether the calculated Hash value is identical to the Hash value obtained by decoding the signature or not. When the Hash value of the data transmitted is determined to be identical to the decoded Hash value, it is proved that the received data is not falsified and the data has been transmitted from a sending side holding the secret key corresponding to the disclosed key. As the Hash function of signature, MD4, MD5 and SHA-1 are used.

Next, the disclosed key encryption will be explained. For the common key encryption system in which the identical key (common key) is used for encryption and decoding, the key used for encryption is different from the key used for decoding in the disclosed key encryption system. In the case of using the disclosed key encryption, if one key is disclosed, the other key may be kept secret. The key which may be disclosed is called a public key and the other key which should be kept secret is called a secret key.

The typical RSA (Rivest-Schamir-Adleman) encryption in the disclosed key encryption will be explained briefly. First, two sufficiently large prime numbers p and q are obtained and then n which is a product of p and q is obtained. Here, the least common multiple L of (p−1) (1-1) is calculated and moreover the number e which is larger than 3 but under L and is in the relationship of the prime number for L is obtained (namely, e and L are divided in common with only 1).

Next, the inverse element d of multiplication of e regarding the multiplication in which L is defined as modulus is obtained. Namely, relationship ed=1 mod L is formed among e and L and d can be calculated with the Euclidean mutual division. In this case, n and e are defined as the public keys and p, q and d are defined as the secret keys.

The encrypted sentence C can be calculated by the process of equation (1) from the plain-text M.

$$C = M^e \bmod n \quad (1)$$

The encrypted sentence C is decoded to the plain text with the process of equation (2).

$$M = C^d \bmod n \quad (2)$$

Although proofing is omitted here, conversion of plain text to the encrypted sentence with the RSA encryption and decoding thereof are based on the Fermat's little theorem and the equation (3) can be established.

$$M = C^d = (M^e)^d = M^{(ed)} = M \bmod n \quad (3)$$

When the secret keys p and q are known, the secret key d can be calculated from the public key e, but if the number of digits of the public key n is increased in such a degree that factorization in prime factors of the public key n is difficult from the viewpoint of calculation, the secret key d cannot be calculated from the public key e and decoding is impossible only by detecting the public key n. As explained above, in the RAS encryption, different keys may be used for the encryption and decoding, respectively.

Moreover, the elliptical curve encryption which is another example of public key encryption will also be explained briefly. A certain point on the elliptical curve $y^2 = x^3 + ax + b$ is defined as B. Addition of the points on the elliptical curve are defined and nB indicates the result of addition of B of n times. Similarly, subtraction is also defined. It is proved that subtraction of n from B and nB is difficult. Here, B and nB are defined as the public keys and n as the secret key. Using a random number r, the encrypted sentences C1 and C2 can be calculated from the plain text with the processes of the equations (4) and (5) using the public key.

$$C1 = M + rnB \quad (4)$$

$$C2 = rB \quad (5)$$

The encrypted sentences C1 and C2 can be decoded to the plain text with the process of equation (6).

$$M = C1 - nC2 \quad (6)$$

The sentence having the secret key n can be decoded. As explained above, as in the case of the RSA encryption, different keys may be used respectively for the encryption and decoding in the elliptical curve encryption system.

Returning again to FIG. 4, the mutual authentication means 39 of content provider 2 mutually authenticates the EMD service center 1 prior to receiving the supply of the distribution key Kd from the EMD service center 1. The mutual authentication means 39 can also authenticate the service provider 3 prior to transmission of the content provider secure container to the service provider 3. In the case of this example, since the content provider secure container does not include the information which shall particularly be kept secret, this mutual authentication is not always required.

Figure 8:
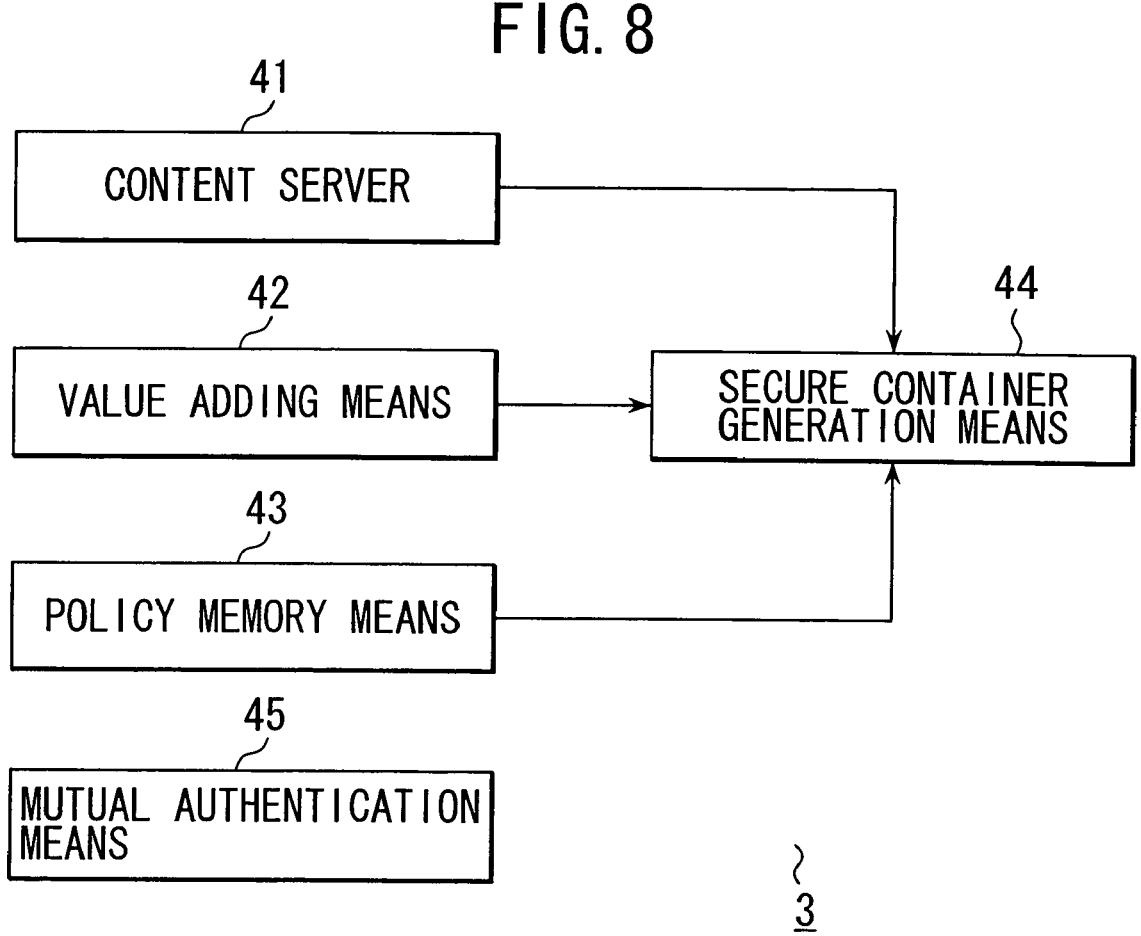
FIG. 8 is a block diagram illustrating a functional structure of the service provider 3.

Next, with reference to the block diagram of FIG. 8, the functional structure of the service provider 3 will be explained. The content server 41 stores the content (encrypted with content key Kco), content key Kco (encrypted with the distribution key Kd), UCP and signature of content provider 2 included in the content provider secure container supplied from the content provider 2 and then supplies these data to the secure container generation means 44.

A value adding means 42 verifies validity of content provider secure container based on the signature included in the content provider secure container supplied from the content provider 2 and when it verifies validity, it generates PT corresponding to UCP included in the content provider secure container and supplies this PT to the secure container generation means 44. FIGS. 9A and 9B illustrate PAT-1

(FIG. 9A) and PAT-2 (FIG. 9B) generated corresponding to UCPA of FIG. 5. PT includes the predetermined information pieces to be set to each item of "ID of content provider", "ID of UCP", "Period of validity of UCP", "ID of service provider", "ID of PT", "Period of validity of PT", "Price condition" and "Price content".

To each item of "ID of content", "ID of content provider", "ID of UCP" and "Period of validity of UCP" of PT, the information pieces of the corresponding items are set respectively. Namely, to the "ID of content" of PAT-1 and PAT-2, ID of content is set, while to the "ID of content provider", ID of content provider 2 is set, to the "ID of UCP", ID of UCPA is set and to the "Period of validity of UCP", the period of validity of UCPA is set, respectively.

To the "ID of service provider", ID of service provider as the providing source of PT is set. To the "ID of service provider" of PAT-1 and PAT-2, ID of service provider 3 is set respectively. To the "ID of PT", the predetermined I D assigned to each PT is set and to the "ID of PT" of PAT-1, ID of PAT-1 is set and to the "ID of PT", ID of PAT-2 are set respectively. To the "Period of validity of PT", the information indicating the period of validity of PT is set, to the "Period of validity of PT" of PAT-1, the information indicating the period of validity of PAT-1 is set and to the "Period of validity of PT" of PAT-2, the information indicating the period of validity of PAT-2 is set.

Like the "Usage condition" of UCP, the "Price condition " is formed of the items of "User condition" and "Device condition". To the "User condition", the information indicating the condition of user who can select this PT is set and to the "Device condition", the information indicating condition of device which can select this PT is set.

In the case of PAT-1, the "Price condition 10" is set and to the "User condition 10" of the "Price condition 10", the information indicating that a user is a male ("Male") is set and to the "Device condition 10", the "No-condition" is set. Namely, only a male user can select PAT-1.

In the case of PAT-2, the "Price condition 20" is set and to the "User condition 20" of the "Price condition 20", the information indicating that a user is a female ("Female") is set. To the "Device condition 20" thereof, the "No-condition" is set. Namely, only a female can select PAT-2.

A usage accounting of usage format being set to "Format" of "Usage content" of the corresponding UCP (price of right for using content in the usage format) is indicated in the "Price content" of PT. The ¥2000 of the "Price content 11" of PAT-1 and ¥1000 of "Price content 21" of PAT-2 are charges for using the content A in the usage format of "Purchase and Reproduction" (price of the right for using in the usage format of "Purchase and Reproduction").

The ¥600 of "Price content 12" of PAT-1 and ¥300 of "Price content 22" of PAT-2 indicate the prices of right for using the content A in the usage format of "Reproduction with period limitation" from the "Format 12" of "Usage content 12" of UCPA. The ¥300 of "Price content 13" of PAT-1 and the ¥150 of "Price content 23" of PAT-2 indicate the prices of right for using the content A in the usage format of "Reproduction with usage period limitation". The ¥100 of "Price content 14" of PAT-1 and the ¥50 of "Price content 24" of PAT-2 indicate the prices of right for using the content A in the usage format of "Pay Per PlayN(=1)" from the "Format 14" of "Usage content 14" of UCPA.

The ¥1950 of "Price content 15" of PAT-1 and the ¥980 of "Price content 25" of PAT-2 indicate the prices of right of "Purchase and Reproduction" when having the right of "Reproduction with period limitation" from the "Format 15" of "Usage content 15" of UCPA. The ¥50 of "Price content 16" of PAT-1 and the ¥25 of "Price content 26" of PAT-2 indicate the prices of right of the 11th "Pay Per PlayN(=1)".

Returning to FIG. 8, the policy memory means 43 stores UCP of content supplied from the content provider 2 and supplies it to the secure container generation means 44. The secure container generation means 44 generates, as illustrated for example in FIG. 10, the service provider secure container consisting of the content A (encrypted with the content key KcoA), content key KcoA (encrypted with the distribution key Kd), UCPA, signature of content provider 2, PAT-1, A-1 and signature of service provider 3 thereof.

Figure 11:
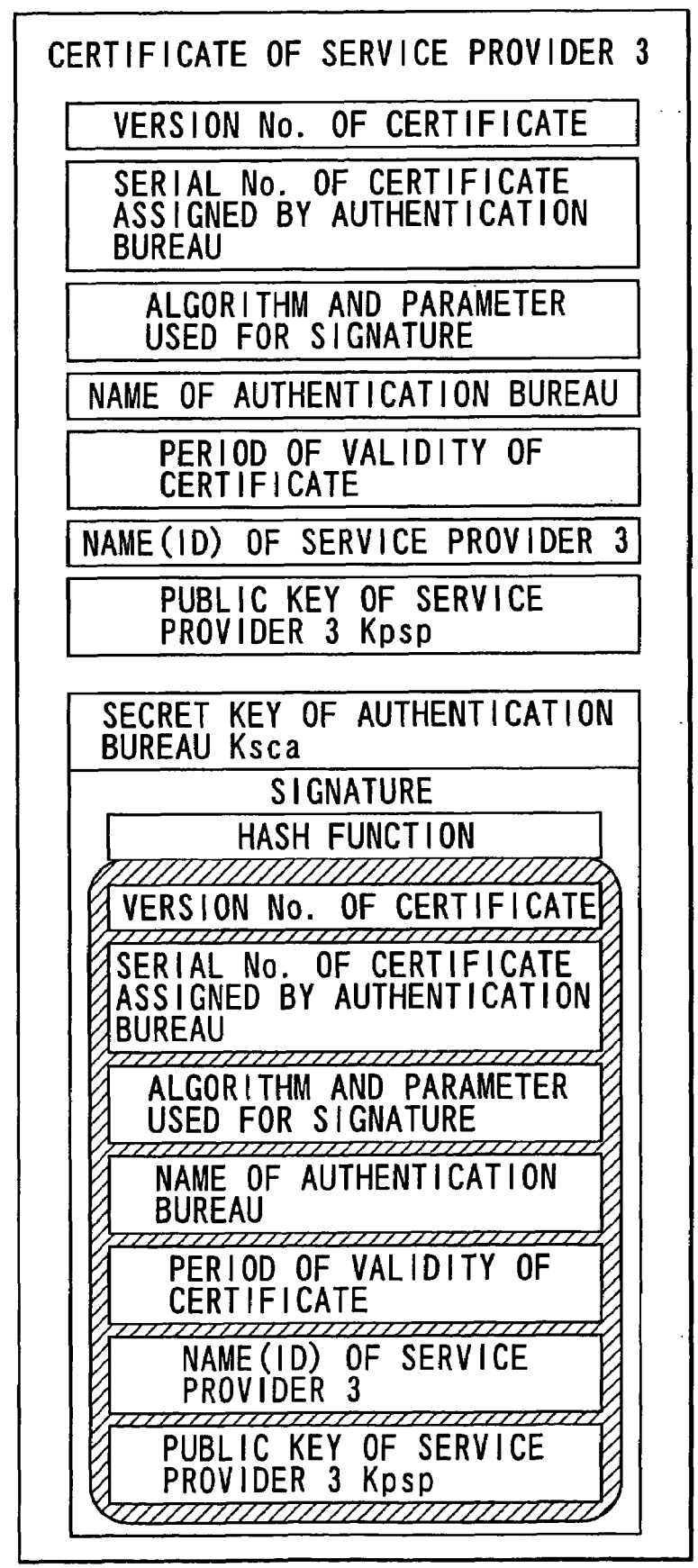
FIG. 11 is a diagram illustrating an example of the certificate of the service provider 3.

The secure container generation means 44 also supplies the generated service provider secure container to the user home network 5 with addition, as illustrated in FIG. 11, of the version number of certificate, serial number of certificate assigned to the service provider 3 by the authentication bureau, algorithm and parameter used for signature, name of authentication bureau, period of validity of certificate, name of service provider 3, public key kpsp of service provider 3 and signature.

Returning again to FIG. 8, the mutual authentication means 45 mutually authenticates the user home network 5 prior to transmission of service provider secure container to the user hole network 5 but the mutual authentication is not executed, for example, when the network 4 is a satellite communication. In the case of this example, since the secret information is not particularly included in the content provider secure container and service provider secure container, the service provider 3 is not required to execute the mutual authentication of content provider 2 and user home network 5.

Figure 12:
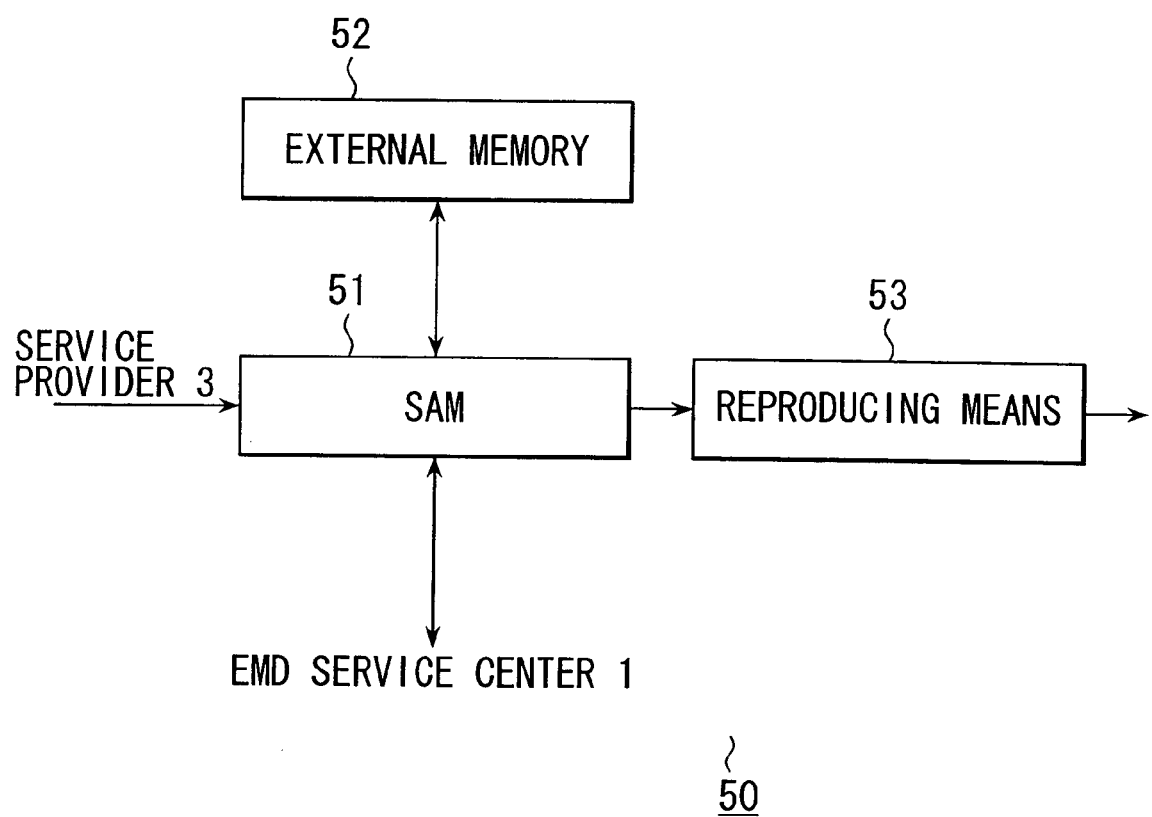
FIG. 12 is a block diagram illustrating an example of functional structure of receiver 50 of user home network 5.

Next, an example of structure of the receiver 50 forming the user home network 5 is explained with reference to the block diagram of FIG. 12. SAM (Secure Application Module) 51 generates UCS and accounting information based on UCP and PT included in the service provider secure container supplied from the service provider 3 and stores these data with the content key Kco included in the service provider secure container (encrypted with the distribution key Kd). FIG. 13 illustrates the UCSA generated on the basis of UCPA of FIG. 5 and price content 11 of PAT-1 of FIG. 9A. UCS includes, as illustrated in FIG. 13, the information set to each item of the "ID of, "ID of content provider", "ID of UCP", "Period of validity of UCP", "ID of service provider", "ID of PT", "Period of validity of PT", "ID of UCS", "ID of SAM", "ID of User", "Usage content", "Parameter" and "Purchase history".

To each item of "ID of content", "ID of content provider", "ID of UCP", "Period of validity of UCP", "ID of service provider", "ID of PT" and "Period of validity of PT" of UCS, the information of corresponding items is set. Namely, to the "ID of content" of UCSA of FIG. 13, ID of the content A is set, to the "ID of content provider", ID of the content provider 2, to the "ID of UCP", ID of UCPA, to the "Period of validity of UCP", the period of validity of UCPA, to the "ID of service provider", ID of service provider 3, to the "ID of PT", ID of PTA-a, and to the "Period of validity of PT", period of validity of PAT-1, respectively.

To the "ID of UCS", the predetermined ID assigned to UCS is set, to the "ID of UCS" of UCSA, ID of UCSA is set. To the "ID of SAM", ID of SAM of device is set. To the "ID of SAM", ID of SAM 51 of the receiver 50 is set. To the "ID of user", ID of user using the content is set and to the "ID of user" of UCSA, ID of user of the receiver 50 is set.

The "Usage content" is formed of the items of "ID" and "Format". To these items, the information of the corresponding items of the predetermined "Usage content" of UCP is set. To the "Parameter", the information corresponding to the usage format set to the "Format" of "Usage content" is set. For instance, when the "Reproduction with usage period limitation" being set to the "Format 13" of "Usage content 13" of UCPA is set to the "Format" of "Usage content" of UCSA, the total time of reproduction is set to the "Parameter". Moreover, when "Pay Per PlayN" of "Usage content 14" of UCPA is set, the remaining number of times of reproduction is set to the "Parameter". As the "Purchase history", the purchase history of right for the content for which the ID is set to the "IC of content" of UCS is set.

To the "Usage content" of UCSA, any one information among "Usage content 11" to "Usage content 16" of UCPA is set.

FIG. 14 illustrates the accounting information A generated simultaneously with UCSA of FIG. 13. The accounting information includes, as illustrated in FIG. 14, the predetermined information to be set to each item of the "ID of content", "ID of content provider", "ID of UCP", "Period of validity of UCP", "ID of service provider", "ID of PT", "Period of validity of PT", "ID of UCS", "ID of SAM", "ID of user", "Usage content" and "Accounting amount".

To the "ID of content", "ID of content provider", "ID of UCP", "Period of validity of UCP", "ID of service provider", "ID of PT", "Period of validity of PT", "ID of UCS", "ID of SAM", "ID of user", "Usage content" of accounting information, information of corresponding items is set respectively. Namely, to the "ID of content" of the accounting information A of FIG. 14, ID of the content A is set. To the "ID of content provider", ID of the content provider 2 is set. To the "ID of UCP", ID of UCPA is set. To the "Period of validity of UCP", the period of validity of UCPA is set. To the "ID of service provider", ID of the service provider is set. To the "ID of PT", ID of PAT-1 is set. To the "Period of validity of PT", the period of validity of PAT-1 is set. To the "ID of UCS", ID of UCSA is set. To the "ID of SAM", ID of SAM5 is set. To the "ID of user", ID of user of the receiver 50 is set. To the "Usage content", content of "Usage content" of UCSA is set. To the "Accounting amount", the amount of accounting is set when accounting is accounted with the price other than the price indicated in the "Price content" provide for PT.

SAM 51 also decodes the content stored in the external memory 52 (encrypted with the content key Kco) on the basis of generated UCS and then outputs the content to the reproducing means 53.

The external memory 52 stores the content (encrypted with the content key Kco) and also supplies, as requested, the content (encrypted with the content key Kco) to SAM51. The reproducing means 53 is formed, for example, of D/A converter or the like to convert the content (decoded) supplied from SAM51 to the analog signal to output from external device (for example, speaker).

Figure 15:
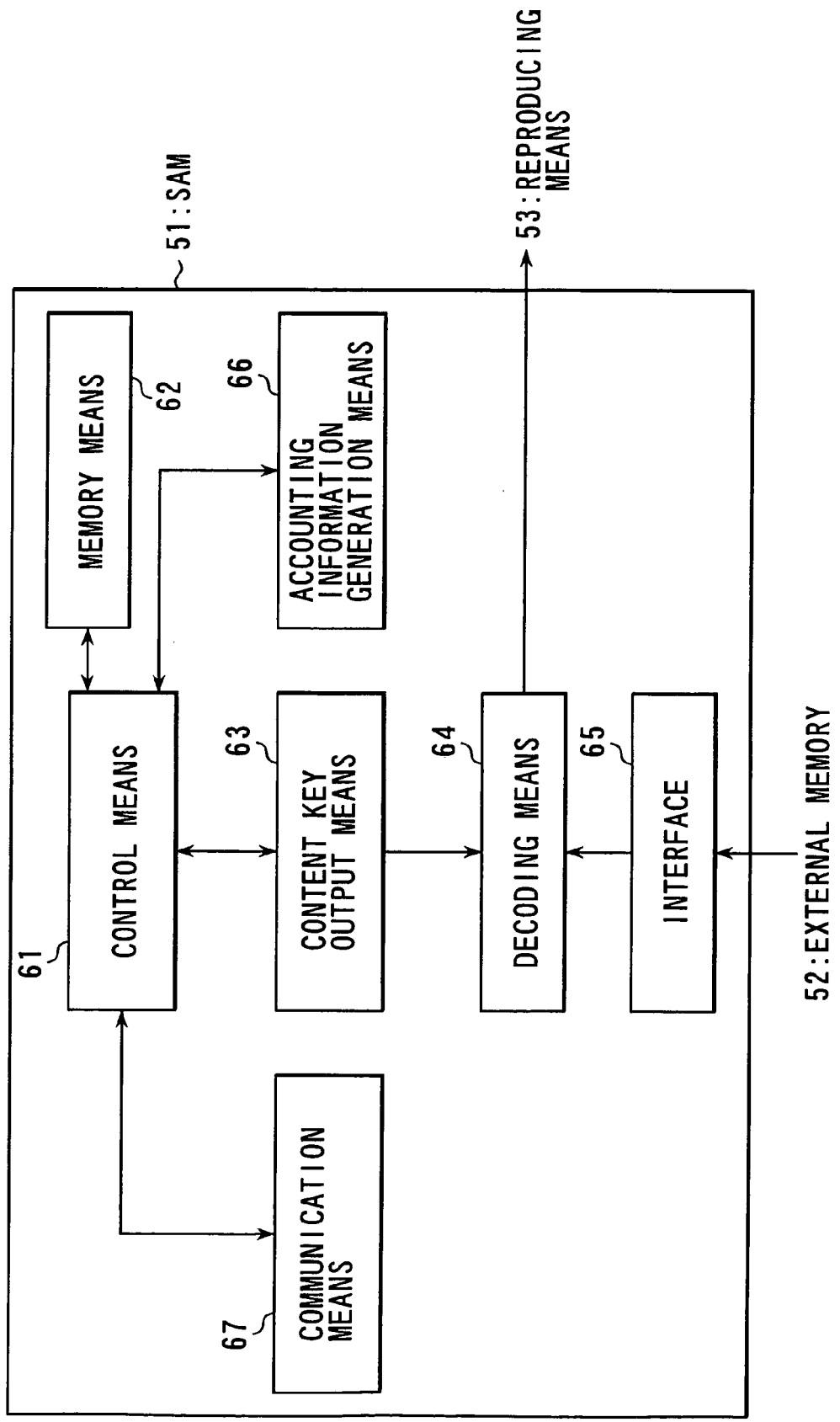
FIG. 15 is a block diagram illustrating an example of functional structure of SAM51 of the receiver 50.

Next, with reference to FIG. 15, an example of functional structure of SAM 51 of the receiver 50 will be explained. The memory means 62 stores UCP and PT included in the service provider secure container and generated UCS. The control means 61 controls each means and is also operated by a user in its manipulation means not illustrated. When the signal to instruct reproduction and purchase of content is input from the manipulation means, UCP, PT and UCS stored in the memory means 62 are output to the content key output means 63 or accounting information generation means 66.

A content key output means 63 holds the content key Kco (encrypted with the distribution key Kd) and determines, when the content is reproduced, whether reproduction of content is possible or not depending on the UCP, PT and UCS supplied from the control means 61. When reproduction is possible, the content key Kco (encrypted with the distribution key Kd) is output to a decoding means 64. The content key output means 63 also updates UCS depending on the usage format of content each time when the content is reproduced.

The decoding means 64 decodes the content key Kco (encrypted with the distribution key Kd) supplied from the content key output means 63 with the distribution key Kd separately supplied from the EMD service center 1 and also decodes the content (encrypted with the content key Kco) read via an interface 65 to output it to the reproducing means 53.

An accounting information generation means 66 generates, when the content is purchased (when the right for using the content is purchased), the accounting information depending on the right to be purchased and also generates or updates UCS. The accounting information generated with the accounting information generation means 66 is transmitted via a communication means 67 to the EMD service center 1 and is then processed. The communication means 67 makes communication with the service provider 3 or EMD service center 1 via the network 4 to receive or transmit the predetermined information.

Figure 16:
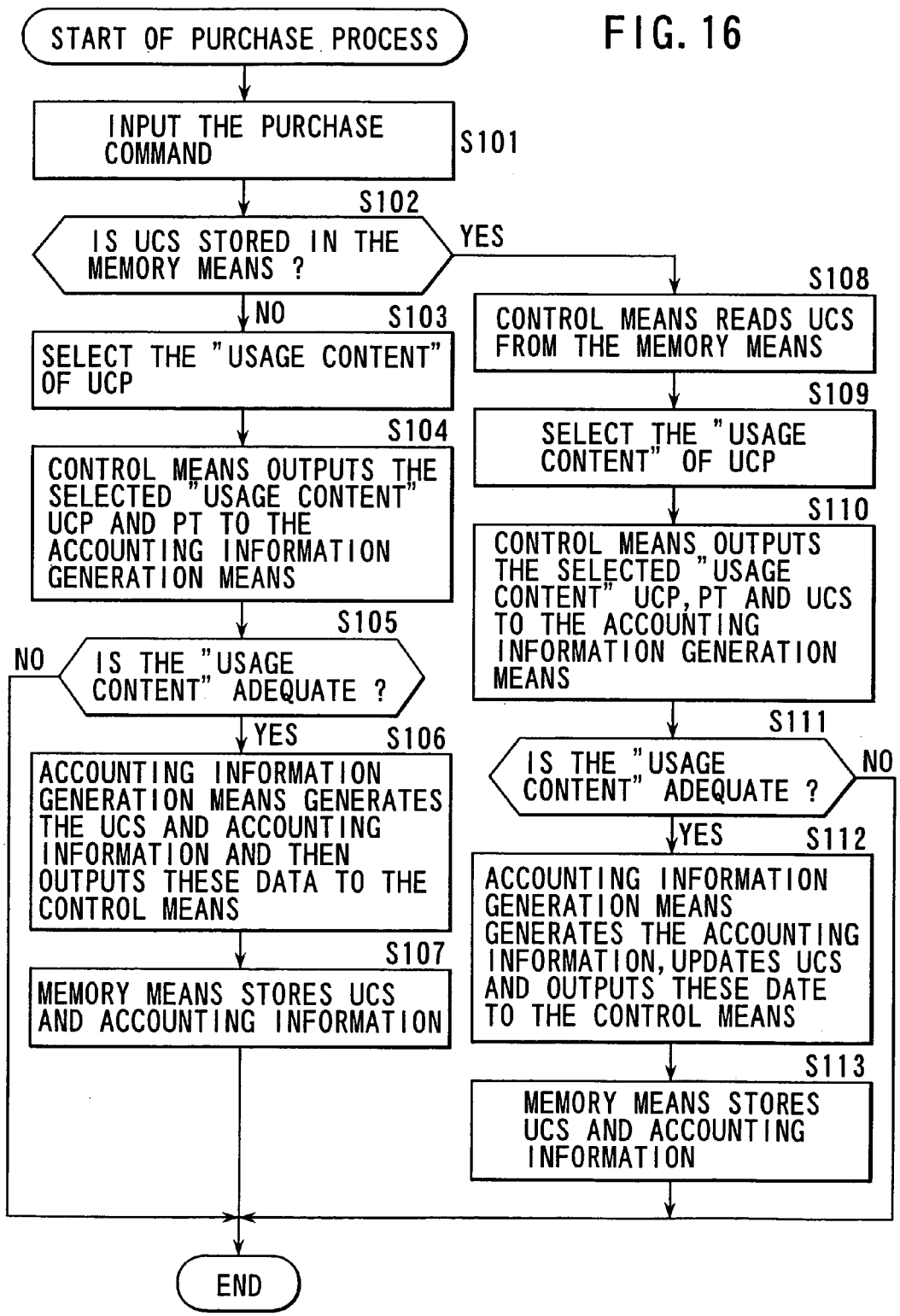
FIG. 16 is a flowchart for explaining the content purchase process.

Next, the processing procedures of receiver 50 in such a case of purchasing the right for using the content A will be explained with reference to the flowchart of FIG. 16. In the case of this example, it is assumed that the service provider secure container of FIG. 10 is supplied to the receiver 50 from the service provider 3.

When the a user manipulates the operation means not illustrated of the receiver 50 and a signal (including the ID of content A) instructing purchase of the content A is input to the control means 51 of SAM51 in the step S101, the control means 61 determines, in the step S102, whether UCS setting the ID of content A to the "ID of content" is stored in the memory means 62 or not. When UCS is not stored in the memory means 62, the process goes to the step S103. For instance, when the right for using the content A is purchased for the first time, UCSA setting the ID of content A to the "ID of content" as illustrated in FIG. 13 is not stored (generated) in the memory means 62 and therefore the process goes to the step S103.

Figure 10:
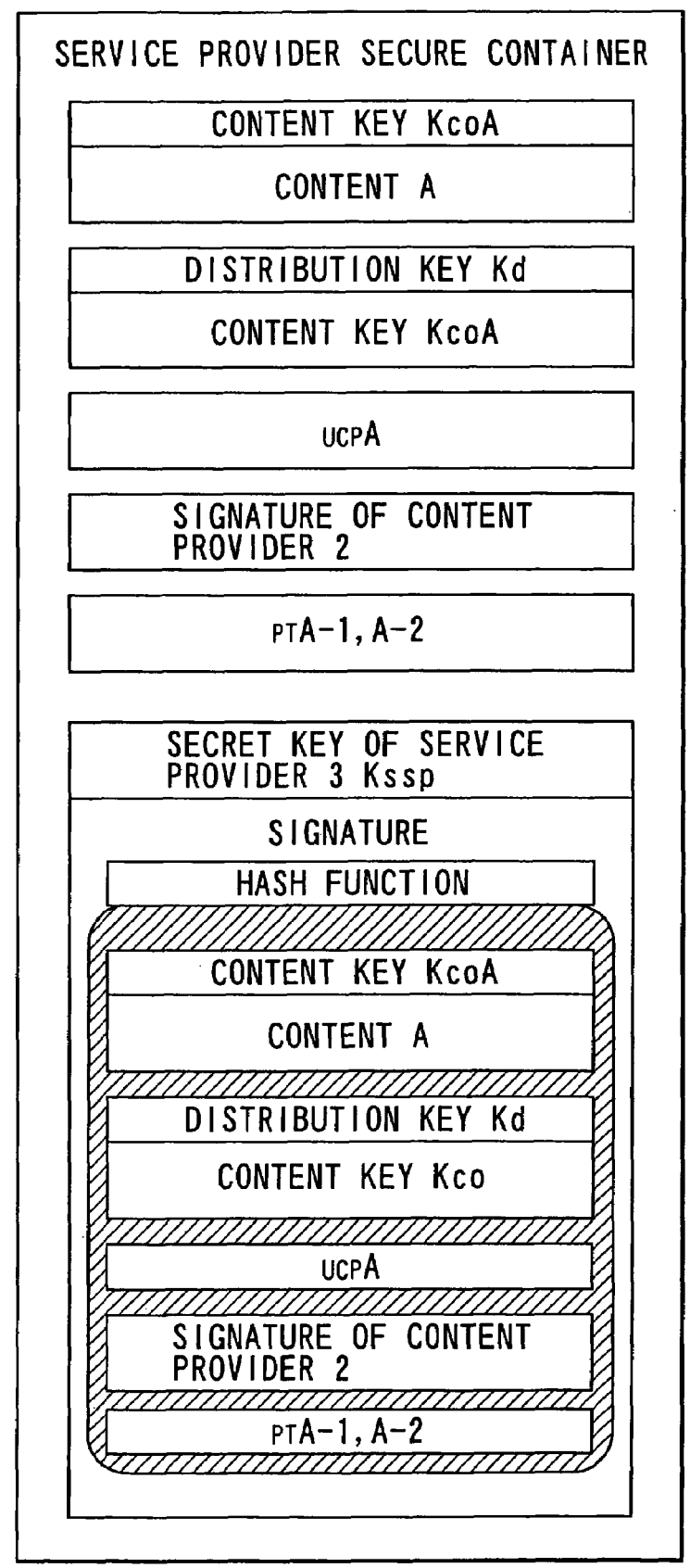
FIG. 10 is a diagram illustrating an example of the service provide secure container.

In the step S103, UCP and PAT-1, PAT-2 included in the service provider secure container of FIG. 10 are extracted and are then displayed on the display means (not illustrated) of the receiver 50. A user executes, at the operation means of receiver 50, the manipulation for selecting the "Usage content" setting the predetermined usage format to the "Format" from UCPA by referring to the display.

In the step S104, the control means 61 outputs the "Usage content" of UCPA selected by user in the step S103, UCPA, PAT-1, and PAT-2 to the accounting information generation means 66. In the step S105, the accounting information generation means 66 determines whether the "Usage content" of UCPA selected by user in the step S103 is adequate or not. When it is determined as the adequate "Usage format", the process goes to the step S106. In this case, since UCSA does not exist, namely the right for using the content A is purchased for the first time, if the "Usage format 15" or "Usage format 16" which may be used to purchase again the right is selected in the step S103, it is determined as the non-adequate "Usage format". Meanwhile, when the "Usage content 11" to "Usage content 14" of UCPA is selected in the step S103, it is determined as the adequate "Usage content".

In the step S106, the accounting information generation means 66 generates UCS (UCSA, in this case) and the accounting information (accounting information A in this case) based on the "Usage content" of UCPA selected in the step S103 and the "Price content" of the corresponding PT (PAT-1, in this case) and then outputs such data to the control means 61.

In the step S107, the control means 61 makes the memory means 62 store the UCSA and accounting information A supplied from the accounting information generation means 66. As explained above, when the right for using the content is purchased, the process is completed.

When it is determined in the step S102 that UCS including ID of the content for purchasing the right is stored in the memory means 62, the control means 61 of SAM 51 reads such UCS from the memory means 62 in the step S108. For example, when the right for using the content A is purchased and the right is purchased again under the condition that UCSA is stored in the memory means 62 with the processes from the steps S101 to S107 explained above, the process goes to the step S108 to read UCSA from the memory means 62.

Next, in the step S109, UCSA read in the step S108 and UCPA, PAT-1, PAT-2 stored in the memory means 52 in this case are displayed on the display means of receiver 50. Here, the user executes the manipulation for selecting the "Usage content" setting the desired usage format to the "Format" from UCPA at the operation means of receiver 50 by referring to such display.

In the step S110, the control means 61 outputs the "Usage content" of UCPA selected by the user in the step S109 and UCSA, UCPA and PAT-1, PAT-2 stored in the memory means 62 to the accounting information generation mans 66.

In the step S111, the accounting information generation means 66 determines whether the "Usage content" of UCPA selected by user in the step S109 is adequate (corresponding to UCSA) or not. For example, when the "Reproduction with period limitation" (format 12) is set to the "Format" of the "Usage content" of UCSA, namely when the "Usage content 12" of UCPA is selected and the content A is used for "Reproduction with period limitation", if the "Usage content 15" setting the "Format 12→Format 11" in the "Format" is selected, it is determined as the adequate "Usage content". On the other hand, when "Pay Per PlayN", for example, is set to the "Format" of the "Usage content" of UCSA is set, namely when the content A is used by the "Pay Per PlayN", if the "Usage content 15" is selected, it is determined as non-adequate "Usage content".

If the "Usage content 16" setting the "Format 14>=11th times" to the "Format" when the purchase history of 10 times or more for the right of "Pay Per PlayN" is stored in the "Purchase history" of UCSA, it is determined as the adequate "Usage content". Meanwhile, if the "Usage content 16" is selected when only the purchase history under 11th times is stored to the "Purchase history" of UCSA, it is determined as non-adequate "Usage content".

In the step S111, when the "Usage content" of UCPA selected in the step S109 is determined as adequate "Usage content", the process goes to the step S112 and the accounting information generation means 66 generates the accounting information A and updates UCSA to output to the control means 61, based on the "Usage content" of UCPA selected in the step S109 and the "Price content" of corresponding PTA. With update of UCSA, in this case, the purchased right content is added to the "Purchase history" of UCSA. In the step S113, the control means 61 stores such content of right to the memory means 62. Thereafter, the process is completed.

As explained above, the right for using the content is purchased (purchased again), but, in this case, the accounting is settled on the basis of the accounting information generated in this case (in the step S106 or S112).

In above explanation, since the content of right to be purchased again is set to UCP (for example, the "Usage content 15" and "Usage content 16" of UCPA) and the price content of the corresponding PT (for example, "Price content 15" and "Price content 16" of PAT-1 ) is provided, accounting for purchase of the content is read as the amount of price content of the corresponding PT, for example, with the ID of UCP, ID of usage content of UCP or ID of PT, included in the generated accounting information (step S106 or step S112) and is accounted.

However, it is also assumed that the usage content corresponding to the right purchased again is set to UCP and moreover its price content is not set to PT. In this case, the predetermined price is set to the "Accounting amount" of the accounting information and the accounting is accounted depending on such amount. For example, when the right for "Purchase and Reproduction" is purchased under the condition of having the right for "Reproduction with period limitation" if the "Usage content 15" is not provided in UCPA, the price of "Reproduction with period limitation" (¥600 of the "Price content 12" of PAT-1 is subtracted from the price of "Purchase and Reproduction" (¥2000 of the"Price content 11" of PAT-1 ) and the result of subtraction (¥1400 (=2000−600) is set to the "Accounting amount" of the accounting information. Namely, in this case the accounting of ¥1400 is accounted.

Figure 17:
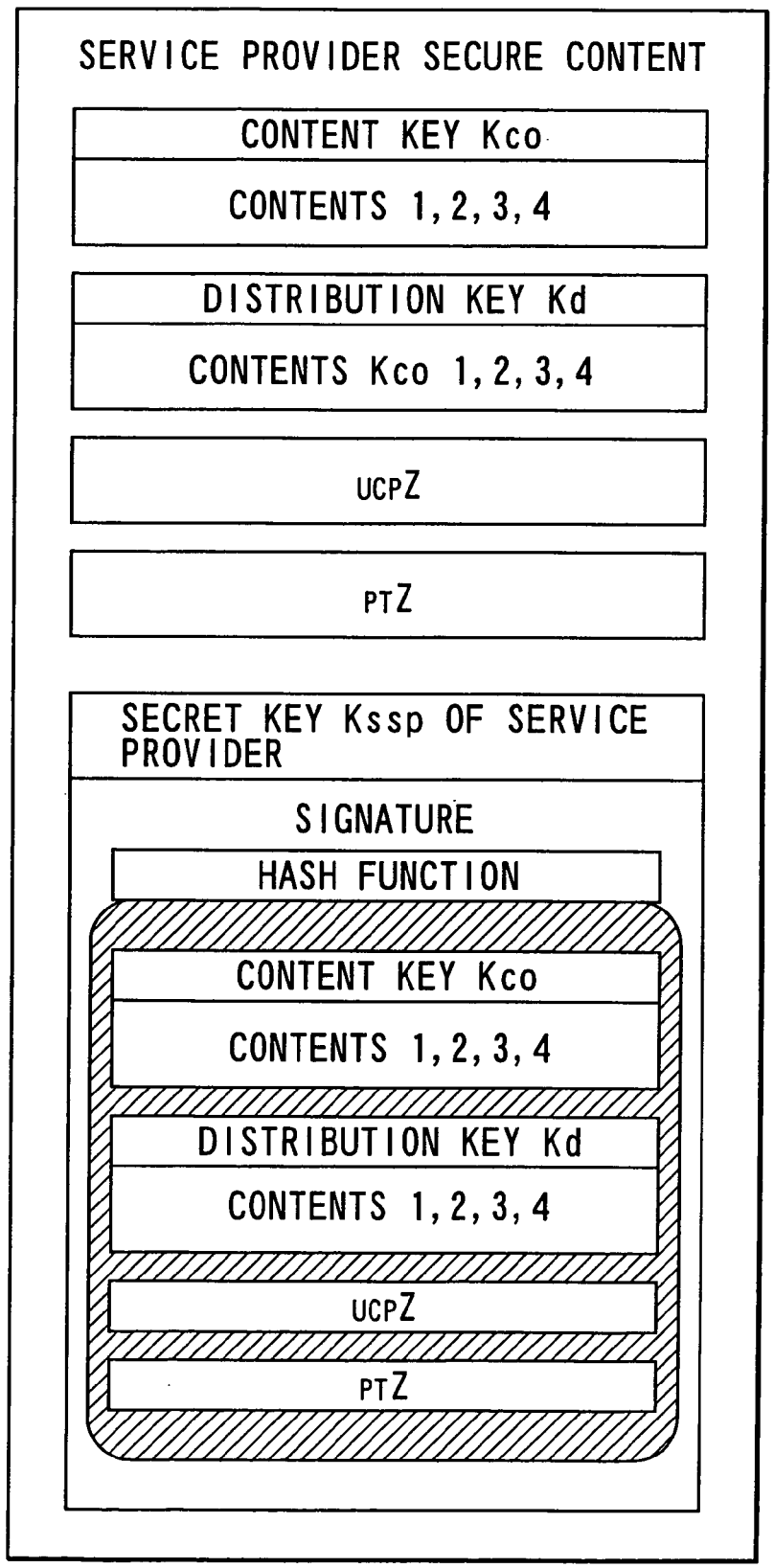
FIG. 17 is a diagram illustrating another example of the service provider secure container.

Moreover, in above explanation, the right for using the content of single form is purchased, but this explanation can also be adapted to the example where the right for using the content of album form (a plurality of contents) is purchased. In this case, the processing procedures of receiver 50 will be explained by referring a gain the flowchart of FIG. 16. In the case of this example, the service provider secure container including a plurality of contents (in this case, four contents from 1 to 4) illustrated in FIG. 17, corresponding content key Kco (in this case, four content keys 1 to 4) and UCSZ and PTZ in which ID of a plurality of contents (in this case, respective ID of four contents 1 to 4) is set to the "ID of content" is supplied to the receiver 51 from the service provider 3. Moreover, in this case, the right for using the content 1 and content 2 in the "Purchase and Reproduction" mode are assumed to be held (purchased), namely UCS1 of FIG. 20 (UCS where ID of content 1 is set) and UCS2 of FIG. 21 (UCS where ID of content 2 is set), content key Kco1, 2 and contents 1, 2 are assumed to be held in the receiver 50.

When the operation means of receiver 50 is manipulated by a user and the signal (respectively including the ID of the contents 1, 2, 3, 4) instructing the purchase of content of the album form is input to the control means 61, the control means 61 determines, in the step S102, that UCS corresponding to the purchase of this time exists because UCS1 setting the ID of content 1 and UCS2 including the ID of content 2 are stored in the memory means 62 and the process goes to the step S108 to read UCS1, 2 from the memory means 62.

Next, in the step S109, UCS1, 2 read in the step S108 and UCPA and PTX, extracted in this case from the service provider secure container are displayed on the display means of receiver 50. In response to this display, the user executes the manipulation for selecting the "Usage content 101" of UCPZ to the operation mans of receiver 50.

In the step S110, the control means 61 outputs the content of the "Usage content 101" of UCPZ selected by user in the step S109, UCS1, 2, UCPZ and PTZ to the accounting information generation mans 66.

Next, in the step S111, the accounting information generation mans 55 determines whether the "Usage content 101" of UCPZ selected by user in the step S109 is adequate or not. In this case, the "Usage content 101" of UCPZ is determined as the adequate "Usage content" and the process goes to the step S112.

In the step S112, the accounting information generation means 66 generates the accounting information to update UCS1, 2 based on the "Usage content 101" of UCPZ selected in the step S109 and the "Price content 101" of the corresponding PTZ. In this case, to the "accounting amount" of the accounting information, the amount (¥1000 (=2500–1500)) obtained by subtracting the amount (for example, ¥1500) paid for purchase of right for "Purchase and Reproduction" of the content 1 and content 2 from the ¥2500 of the "Price content 101" of PTZ is set.

In the step S112, the accounting information generation means 66 outputs the accounting information generated in the step S112 and updated UCS 1, 2 to the control means 61. In the step S113, the control means 61 causes the memory means 52 to store such accounting information and UCS1, 2. In the timing to execute the process in the step S113, contents 2, 3, 4, content keys Kco2, 3, 4, UCPZ and PTZ included in the service provider secure container are stored in the external memory 52.

As explained above, the right for using the content of album form may be purchased.

Figure 22:
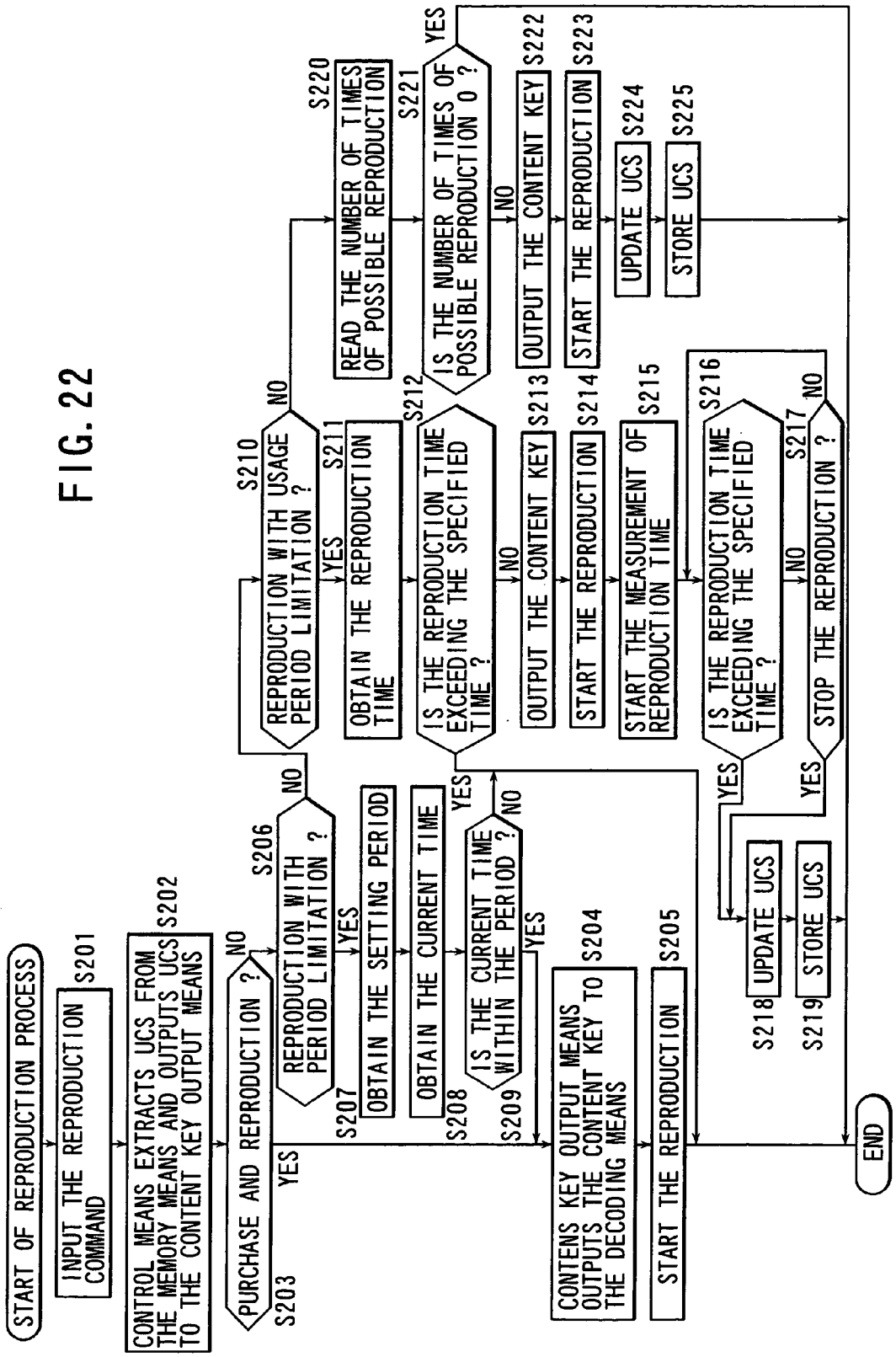
FIG. 22 is a flow chart for explaining the content usage process.

Next, the processing procedures of receiver 50 for using the content A based on the usage format corresponding to the right purchased will be explained with reference to the flowchart of FIG. 22. In the case of this example, it is assumed that UCSA, UCPA and PAT-1, PAT-2 are already stored in the memory means 62, while the content A is already stored in the external memory 52.

In the step S201, when the operation means not illustrated of the receiver 50 is manipulated by user and the reproduced signal of content A is input to the control means 61 from the operation means, the control means 61 reads UCSA from the memory means 62 in the step S202 and then outputs UCSA to the content key output means 63.

In the step S203, the content key output means 63 determines whether the "Purchase and Reproduction" is set or not to the "Format" of the "Usage content" of UCSA supplied from the control means 61. When the "Purchase and Reproduction" is set, the process goes to the step S204.

In the step S204, the content key output means 63 outputs the content key KcoA (encrypted with the distribution key Kd) to the decoding means 64. Thereby, the reproducing operation of content A (encrypted with the content key Kco) is started in the step S205. In more practical, the decoding means 64 decodes the supplied content key Kco (encrypted with the distribution key Kd) with the distribution key Kd supplied separately from the EMD service center 1 and outputs the decoded content to the reproducing means 53. The reproducing means 53 converts the content (decoded content) supplied from the decoding means 64 of SAM 51 and then outputs the content of analog signal from a speaker, for example, not illustrated.

When the "Purchase and Reproduction" is not set to the "Format" of the "Usage content" of UCSA in the step S203, the process goes to the step S206 and the content key output means 63 determines whether the "Reproduction with period limitation" is set or not. When it is set, the process goes to the step S207.

The content key output means 63 obtains the respective periods (times) in the step S207 by referring to the "Format" of the "Usage content" of UCSA where the start period (time) and end period (time) are set. Next, the content key output means 62 detects, in the step S208, the current time by referring the built-in clock and determines whether the current time is within the range of the obtained period (time) or not. When the current time is within the range obtained, the process goes to the step S204 and the subsequent processes are then executed. Namely, the content A is reproduced.

When it is determined, in the step S209, that the current time is not within the range of the time obtained in the step S207, the process is completed. Namely, the content A is not reproduced.

When the "reproduction with period limitation" is not set to the "Format" of the "Usage content" of UCSA in the step S206, the process goes to the step S210 and it is then determined whether the "Reproduction with usage period limitation" is set or not. When it is set, the process goes to the step S211. The content key output means 63 obtains in the step S211 the reproduction time by referring to the "Parameter" of UCSA and it is then determined in the step S212 whether such reproduction time is exceeding or not the specified time set to the "Format". When it is determined that such reproduction time does not exceed the specified time, namely when the reproduction is possible, the process goes to the step S213. When it is determined in the step S212 that the reproducing time has exceeded the specified time, the process is completed. Namely, the content A is never reproduced.

In the step S213, the content key output means 63 outputs the content key KcoA (encrypted with the distribution key Kd) to the decoding means 64. Thereby, the reproducing operation of content A is started in the step S214 as in the case of the step S205.

Next, the content key output means 63 starts, in the step S215, the measurement of reproducing time of the content A with the built-in clock and determines, in the step S216, whether the total time of the result of measurement and the reproducing time before the current use obtained in the step S211 has exceeded the specified time or not. When the total time is determined not exceeding the specified time, the process goes to the step S217.

The content key output means 63 determines, in the step S217, whether a user manipulates the operation means of the receiver 50 and the instruction for stopping reproduction of the content A is issued or not. When it is determined that the instruction for stopping reproduction is not issued, the process returns to the step S216.

When it is determined that the instruction for stopping reproduction is issued in the step S217, the content key output means 63 stops, in the step S218, the measurement of reproducing time started in the step S215, sets the total time of the measurement result and the reproducing time obtained in the step S211 to the "Parameter" of UCSA, then updates UCSA and thereafter outputs UCSA to the control means 61. In the step S219, the control means 61 stores UCSA updated with the content key output means 63 to the memory means 62. Thereafter, the process is completed.

When it is determined that the reproducing time has exceeded the specified time in the step S216, the process goes to the step S218 and the content key output means 63 sets the total time (time exceeding the specified time) of the result measured with the clock and the reproducing time before the current use to the "Parameter" to update UCSA. Next, in the step S219, the control means 61 stores UCSA updated with the content key output means 63 to the memory means 62. Thereafter, the process is completed.

When the it is determined in the step S210 that the "Reproduction with period limitation" is not set to the "Format" of the "Usage content" of UCSA, the process goes to the step S220. In this case, since the "Pay Per PlayN" is set there, the number of times of the possible reproduction is read by referring to the "Parameter" and it is then determined in the step S221 whether the number of times of possible reproduction is set to 0 or not. When it is determined the number of times of possible reproduction is never set to 0, the process goes to the step S222.

Next, in the step S222, the content key output means 63 outputs the content key KcoA (encrypted with the distribution key Kd) to the decoding means 64. Thereby, in the step S223, the reproducing operation of the content A is started as in the case of the step S205 or step S214.

In the step S224, the content key output means 63 executes once the decrement for the number of times of possible reproduction being set to the "Parameter" of UCSA to update UCSA and then outputs the updated UCSA to the control means 61. The control means 61 stores, in the step S225, the updated UCSA to the memory 62.

As explained above, the content A can be used in the usage format corresponding to the right purchased.

FIG. 23 illustrates the other UCSA 10 generated by the accounting information generation means 66 of SAM 51. In the UCSA 10, the "Usage history" is further provided in UCSA of FIG. 13. In this "Usage history", the usage result (history) such as the number of times of actual usage of the content A is stored. For instance, when the right for "Purchase and Reproduction" of the content A is purchased and the content A is reproduced for M times, the history of reproduction of M times is stored in the "Usage history".

Next, the purchase process using the "Usage history" of UCSA10 will then be explained. In the case of this example, history indicating the content A is reproduced for 10 times or more is stored in the "Usage history" of UCSA10 and UCSA10 is assumed to be stored in the memory means 62. Moreover, in this example, it is also assumed that UCPA 10 is included, in place of UCPA of FIG. 5, to the service provider secure container supplied to the receiver 50 and PTA10-1, PTA10-2 of FIG. 9 are also included thereto in place of PAT-1, PAT-2.

The "Usage content 17" of UCPA of FIG. 5 is moreover provided in the UCPA10 of FIG. 24. In the "Usage content 17", the predetermined ID assigned to the "Usage content 17" is set to the "ID17". To the "Format 17", the usage format of "Number of times of reproduction of 10 times→ Format 14" is set. When the user has executed reproduction of content A for 10 times or more, it is possible to purchase this right. The user can utilize the content A with "Pay Per PlayN" by purchasing this right.

In the PTA10-1 of FIG. 25A, the "Price content 17" is further provided in the PTA-1 of FIG. 9A. In the PTA10-2 of FIG. 25B, the "Price content 27" of PAT-2 of FIG. 9B is moreover provided. The ¥75 of the "Price content 17" of PTA10-1 and the ¥45 of the "Price content 27" of PTA10-2 indicate the prices of the right for "Pay Per PlayN" when the content A is reproduced for 10 times or more.

Next, the purchase process using the "Usage history" of UCSA10 will then be explained with reference to the flowchart of FIG. 16. In the step S101, when the purchase instruction is input, it is determined in the step S102 whether UCS is stored in the memory means 62 or not. In the case of this example, since UCSA10 is stored in the memory means 62, the process goes to the step S108. The processes of the steps 108 to S110 are similar to those explained above and the same explanation is omitted here.

In the step S111, it is determined whether the "Usage content" of UCPA10 selected by the user in the step S109 is adequate or not. In the case of this example, it is assumed that the "Usage content 17" is selected in the step S109. In this case, since the history indicating that the content A is reproduced for 10 times or more is stored in the "Usage history" of UCSA10, the "Usage content" selected in the step S109 is determined as the adequate one and the process goes to the step S112.

In the step S112, the accounting information generation means 66 generates the accounting information on the basis of the "Usage content 17" of UCPA10 selected in the step S109 and the "Price content 17" of corresponding PTA10-1 or the "Price content 27" of PTA10-2. Namely, in this case, the ¥75 or ¥45 is accounted and the right for "Pay Per CopyN" can be purchased in the price which is rather lower than the price of the "Usage content 14" which may be purchased when the content A is not reproduced for 10 times or more.

As explained above, the purchase process is executed depending on the usage history. For instance, the price for purchase and reproduction of the content A is set to ¥0, namely the content A is rent at no usage accounting and the price is determined depending on the number of times of reproduction by user.

Here, the content is defined as a music data in above explanation but it is not limited to the music data and it may be selected from moving picture data, static picture data, document data or program data.

In this case, the system suitable for the kind of content, for example, MPEG (Moving Picture Experts Group) is used for the moving picture for the compression of signal. As the watermark, the watermark of the format suitable for the kinds of content is used.

In above explanation, the content, content key Kco, UCS are stored together in the external memory 52 but it is also possible to individually store these data by providing a plurality of memories.

In this specification, a system represents the apparatus as a whole, which is formed of a plurality of apparatuses.

Moreover, as a distribution medium for providing the computer program which executes the processes explained above, it is also possible to use the communication medium such as network and satellite in addition to a recording medium such as magnetic disc, CD-ROM and solid-state memory or the like.

What is claimed is:

1. An information processing apparatus utilizing encrypted content in accordance with a usage content comprising:

receipt means for receiving the content, a usage control policy including a plurality of usage contents each of which defines a predefined way the content is used, and a price tag including a plurality of prices each of which corresponds to the predefined way;

storage means for storing the content, the usage control policy and the price tag;

control means for determining whether a usage control status exists in the storage means;

first generation means for generating the usage control status, whether the usage control status exists or not in the storage means, including a usage content which is selected by the user, a price corresponding to the usage content, and a purchase history of the content based on the usage control policy and the price tag;

setting means for setting a usage history based on usage of the content to the usage control status;

putting means for putting a limit on selecting a usage content based on the purchase history or the usage history when selecting a usage content which is not included in the originally received usage control policy and does not have a corresponding price in the originally received price tag;

second generation means for calculating an accounting price and generating accounting information including the accounting price based on the purchase history or usage history; and sending means for sending the accounting information.

2. An information processing method utilizing encrypted content in accordance with a usage content, comprising the steps of:

receiving the content, a usage control policy including a plurality of usage contents each of which defines a predefined way the content is used, and a price tag including a plurality of prices each of which corresponds to the predefined way;

storing in a storage means the content, the usage control policy and the price tag;

determining whether a usage control status exists in the storage means;

generating the usage control status, whether the usage control status exists or not in the storage means, including a usage content which is selected by the user, a price corresponding to the usage content, and a purchase history of the content based on the usage control policy and the price tag;

setting a usage history based on usage of the content to the usage control status;

putting a limit on selecting a usage content based on the purchase history or the usage history when selecting a usage content which is not included in the originally received usage control policy and does not have a corresponding price in the originally received price tag;

calculating an accounting price and generating accounting information including the accounting price based on the purchase history or usage history; and sending the accounting information.

3. A distribution medium providing a computer-readable program for utilizing encrypted content in accordance with a usage content in an information processing apparatus, the program comprising the process of:

receiving the content, a usage control policy including a plurality of usage contents each of which defines a predefined way the content is used; and a price tag including a plurality of prices each of which corresponds to the predefined way;

storing in a storage means the content, the usage control policy and the price tag;

determining whether a usage control status exists in the storage means;

generating the usage control status, whether the usage control status exists or not in the storage means, including a usage content which is selected by the user, a price corresponding to the usage content, and a purchase history of the content based on the usage control policy and the price tag;

setting a usage history based on usage of the content to the usage control status;

putting a limit on selecting a usage content based on the purchase history or the usage history when selecting a usage content which is not included in the originally received usage control policy and does not have a corresponding price in the originally received price tag;

calculating an accounting price and generating accounting information including the accounting price based on the purchase history or usage history; and sending the accounting information.

\* \* \* \* \*